United States Patent
Choi et al.

(10) Patent No.: US 11,596,899 B1
(45) Date of Patent: Mar. 7, 2023

(54) HOLLOW FIBER MEMBRANE MODULE AND METHOD OF MAKING AND USING SAME

(71) Applicant: Saudi Arabian Oil Company, Dhahran (SA)

(72) Inventors: Seung-Hak Choi, Dhahran (SA); Sebastien A. Duval, Dhahran (SA); Milind M. Vaidya, Dhahran (SA); Feras Hamad, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 17/556,056

(22) Filed: Dec. 20, 2021

(51) Int. Cl.
*B01D 53/14* (2006.01)
*B01D 53/22* (2006.01)
(Continued)

(52) U.S. Cl.
CPC ....... *B01D 53/229* (2013.01); *B01D 53/1481* (2013.01); *B01D 53/228* (2013.01); *B01D 53/50* (2013.01); *B01D 53/78* (2013.01); *B01D 53/79* (2013.01); *B01D 63/04* (2013.01); *B01D 69/02* (2013.01); *B01D 2053/224* (2013.01); *B01D 2251/102* (2013.01); *B01D 2251/606* (2013.01); *B01D 2252/1035* (2013.01); *B01D 2257/302* (2013.01); *B01D 2258/0283* (2013.01); *B01D 2311/2665* (2013.01); *B01D 2319/04* (2013.01);
(Continued)

(58) Field of Classification Search
CPC ...... B01D 53/229; B01D 69/02; B01D 53/78; B01D 53/79; B01D 53/1481; B01D 53/50; B01D 53/228; B01D 63/04; B01D 2251/606; B01D 2325/38; B01D 2258/0283; B01D 2257/302; B01D 2251/102; B01D 2319/04; B01D 2319/06; B01D 2311/2665; B01D 2053/224; B01D 2252/1035
See application file for complete search history.

(56) References Cited

U.S. PATENT DOCUMENTS

| 4,268,279 A | * | 5/1981 | Shindo ............... B01D 61/00 422/48 |
| 10,898,858 B2 | | 1/2021 | Nagata et al. |
| 2016/0346739 A1 | | 12/2016 | Panglisch et al. |

FOREIGN PATENT DOCUMENTS

| CN | 102085454 | 6/2011 |
| CN | 107 500 443 A | * 12/2017 ............. B01D 53/78 |

(Continued)

OTHER PUBLICATIONS

U.S. Appl. No. 17/556,079, filed Dec. 20, 2021, Choi et al.
(Continued)

Primary Examiner — Timothy C Vanoy
(74) Attorney, Agent, or Firm — Fish & Richardson P.C.

(57) ABSTRACT

A membrane module includes a housing. The housing includes a housing, comprising: a first plurality of porous hollow fiber membranes, and a second plurality of porous hollow fiber membranes different from the first plurality of porous hollow fiber membranes. The first plurality of porous hollow fiber membranes has a first length, and the second plurality of porous hollow fiber membranes has a second length that is at least 1.1 times greater than the first length. The membrane module can be used in separation methods, such as membrane distillation methods.

20 Claims, 15 Drawing Sheets

(51) Int. Cl.
    *B01D 53/50* (2006.01)
    *B01D 53/78* (2006.01)
    *B01D 53/79* (2006.01)
    *B01D 63/04* (2006.01)
    *B01D 69/02* (2006.01)
(52) U.S. Cl.
    CPC ...... *B01D 2319/06* (2013.01); *B01D 2325/38* (2013.01)

(56) References Cited

FOREIGN PATENT DOCUMENTS

| CN | 111167317 | 5/2020 |
|---|---|---|
| KR | 102128754 | 7/2020 |
| WO | WO 2005028080 | 3/2005 |

OTHER PUBLICATIONS

U.S. Appl. No. 17/556,108, filed Dec. 20, 2021, Choi.
Abrams et al., "Use of seawater in flue gas desulfurization," JAPCA, 1988, 38(7):969-974, 7 pages.
Andreasen et al., "Use of Seawater Scmbbing for SO2 Removal from Marine Engine Exhaust Gas", Energy & Fuels, 2007, 21:3274-3279, 6 pages.
Choi et al., "Effect of aeration on CaSO4 scaling in membrane distillation process," Desalination and Water Treatment, 2017, 90:7-15, 10 pages.
Kim et al., "Innovative swirling flow-type microbble generator for multi-stage DCMD desalination system: Focus on the two-phase flow pattern, bubble size distribution, and its effect on MD performance," Journal of Membrane Science, 2019, 588:117-197, 15 pages.
Li et al., "Fabrication of lab-scale hollow fiber membrane modules with high packing density," Separation and Purification Technology, 2004, 40:15-30, 16 pages.
Li et al., "Internally staged permeator prepared from annular hollow fibers for gas separation," AIChE Journal, 1998, 44:849-858, 10 pages.
Liu et al., "A comparison of optimal internally staged permeator and external two-stage module design for O2 enrichment from air," Separation Science and Technology, 2001, 36(11):2385-2409, 27 pages.
Liu et al., "Effect of fiber variation on staged membrane gas separation module performance," AIChE Journal, 2001, 47(10):2206-2219, 14 pages.
Oikawa et al., "Seawater Flue Gas Deslfurization: Its Technical Implications and Performance Results," Environmental Progress, Apr. 2003, 22(1):67-73, 7 pages.
Sidhoum et al., "An internally staged hollow-fiber permeator for gas separation," AIChE Journal, 1989, 35(5):764-774, 11 pages.
Sun et al., "Application of seawater to enhance SO2 removal from simulated flue gas through hollow fiber membrane contactor," Journal of Membrane Science, 2008, 312:6-14, 9 pages.
Teoh et al., "Investigation of fifferent hollow fiber module designs for flux enhancement in the membrane distillation process," Journal of Membrane Science, 2008, 311(1-2):371-379, 9 pages.
Wan et al., "Design and fabrication of hollow fiber membrane modules," Journal of Membrane Science, 2017, 538:96-107, 71 pages.
Yang et al., "Novel designs for improving the performance of hollow fiber membrane distillation modules," Journal of Membrane Science, 2011, 384(1-2):52-62, 37 pages.
Ye et al., "Microbubble aeration enhances performance of vacuum membrane distillation desalination by alleviating membrane scaleing," Water Research, 2018, 149:588-595, 30 pages.

\* cited by examiner

HOLLOW FIBER MEMBRANE MODULE AND METHOD OF MAKING AND USING SAME

FIELD

The disclosure relates to a hollow fiber membrane module and a method of making and using such a hollow fiber membrane module.

BACKGROUND

In general, hollow fiber membranes can be used in various fluid separation applications, such as micro-filtration, ultra-filtration, nanofiltration, forward osmosis, reverse osmosis, gas separation, vapor permeation, pervaporation, water reuse, membrane distillation, and membrane contactors.

SUMMARY

The disclosure relates to a hollow fiber membrane module and a method of making and using such a hollow fiber membrane module.

In general, the hollow fiber membrane module provides enhanced efficiency and/or a reduced footprint. As a result, the module can reduce the cost and complexity of separation processes that use the module, and/or improve the efficiency of such processes. In some embodiments, relative to certain known systems, the module can allow one or more additional processes to occur in the module, thereby avoiding the presence of certain additional components external to the module.

The hollow fiber membrane module can be used with various types of separation technologies. In some embodiments, the hollow fiber membrane module can be used in membrane distillation, such as direct contact membrane distillation, vacuum membrane distillation, air gap membrane distillation, and sweeping gas membrane distillation. In certain embodiments, the hollow fiber membrane module can be used as a membrane contactor.

The hollow fiber membrane module can be used in any of a variety of commercial processes. Examples of such processes include produced water treatment, tail gas treatment (e.g., tail gas desulfurization), flue gas treatment (e.g., flue gas desulfurization), mercaptan removal from natural gas, and acid gas separation.

In some embodiments, the hollow fiber membrane module is designed to handle up to three different fluid streams at the same time. As an example, in some embodiments, three streams simultaneously flow through the module, with each stream having a flow path that is different from the flow path of each of the other two streams. In some embodiments, two of the streams are gas streams, and one of the streams is a liquid stream. In certain embodiments, two of the streams are liquid streams, and one of the streams is a gas stream. It is also possible for each of the streams to be a liquid stream or each of the streams to be a gas stream.

In certain embodiments, the module has six different ports. For example, when implemented for simultaneous use with three different fluid streams, each stream can have an inlet that is different from the inlet of each of the other two streams, and/or each stream can have an outlet that is different from the outlet of each of the other two streams.

In some embodiments, the module has two different types of hollow fiber membranes. As an example, one group of the hollow fiber membranes can be longer than the other group of hollow fiber membranes. Optionally, one group of hollow fiber membranes can be made of a material (e.g., a hydrophobic material) that is different from the material (e.g., a hydrophilic material) from which the other group of hollow fiber membranes is made.

In some embodiments, one of the fluid streams is a gas stream with a flow path that passes into the interior of one group of the hollow fiber membranes, such as a group of relatively long hollow fiber membranes. In such embodiments, some of the gas can pass through pores present in the wall of the membranes, to provide gas bubbles to a liquid stream passing along the exterior of the membranes. Without wishing to be bound by theory, it is believed that the gas bubbles in the liquid stream can enhance mass transfer in the liquid stream, which can reduce the difference between the bulk concentration of the liquid stream and the concentration of the liquid stream at the membrane surface. It is also believed that the gas bubbles in the liquid stream can reduce the difference between the bulk temperature of the liquid stream and the temperature of the liquid stream at the membrane surface. It is further believed that the gas bubbles can reduce membrane fouling. The result can be improved performance of the system. Alternatively or additionally, the gas bubbles can act as a reactant in one or more chemical reactions within the module. This can, for example, avoid performing one or more the chemical reaction(s) outside the module, which can reduce the complexity and/or cost associated with performing the process. As an example, if the gas bubbles contain oxygen (e.g., air bubbles), the gas bubbles can be used in the oxidation step of gas desulfurization (e.g., flue gas desulfurization) so that this step, and optionally also neutralization steps, can occur inside the module rather than outside the module.

In some embodiments, the hollow fiber membrane module can exhibit self-supported characteristics. As a result, in some embodiments, the hollow fiber membrane module does not have a feed spacer and/or a permeate spacer, and/or the hollow fiber membrane module has a relatively high hollow fiber membrane packing density and a correspondingly relatively high effective hollow fiber membrane area per unit volume.

In certain embodiments, to enhance the separation and permeation performance (or efficiency) of the hollow fiber membrane module, the module can exhibit relatively low hydrodynamic pressure loss, relatively low concentration polarization, relatively low temperature polarization, relatively high effective membrane area, relatively low mass transfer rate, and/or relatively low fouling tendency. In some embodiments, this can enhance the separation efficiency of the module and/or the cost associated with using the module in separation processes.

In an aspect, the disclosure provides a membrane module that includes a housing. The housing includes a first plurality of hollow fiber membranes and a second plurality of hollow fiber membranes different from the first plurality of porous hollow fiber membranes. The first plurality of porous hollow fiber membranes has a first length, and the second plurality of porous hollow fiber membranes has a second length that is at least 1.1 times greater (e.g., at least 1.2 times greater) than the first length. At least one of the following holds: the first plurality of hollow fiber membranes includes porous hollow fiber membranes, and the second plurality of hollow fiber membranes includes porous hollow fiber membranes; the first plurality of hollow fiber membranes includes dense hollow fiber membranes, and the second plurality of hollow fiber membranes includes porous hollow fiber membranes; the first plurality of hollow fiber membranes includes porous hollow fiber membranes, and the second plurality of hollow fiber membranes includes dense hollow fiber membranes; and the first plurality of hollow fiber membranes includes dense hollow fiber membranes, and the second plurality of hollow fiber membranes includes dense hollow fiber membranes.

In some embodiments, the first plurality of hollow fiber membranes includes a first material, and the second plurality of hollow fiber membranes includes a second material that is different from the first material.

In some embodiments, at least one of the following holds: the first plurality of hollow fiber membranes includes hydrophilic hollow fiber membranes, and the second plurality of hollow fiber membranes includes hydrophilic hollow fiber membranes; the first plurality of hollow fiber membranes includes hydrophobic hollow fiber membranes, and the second plurality of hollow fiber membranes includes hydrophilic hollow fiber membranes; the first plurality of hollow fiber membranes includes hydrophilic hollow fiber membranes, and the second plurality of hollow fiber membranes includes hydrophobic hollow fiber membranes; and the first plurality of hollow fiber membranes includes hydrophobic hollow fiber membranes, and the second plurality of hollow fiber membranes includes hydrophobic hollow fiber membranes.

In some embodiments, the first plurality of hollow fiber membranes include a hydrophilic material, and the second plurality of hollow fiber membranes includes the hydrophilic material. The hydrophilic material can include a polymeric material. The hydrophilic material can include a coating supported by another material.

In some embodiments, each of the first plurality of hollow fiber membranes includes an interior and an exterior, and each of the second plurality of hollow fiber membranes includes an interior and an exterior. The housing can further include: a first inlet port in direct fluid communication with the interiors of the second plurality of porous hollow fiber membranes; a second inlet port different from the first inlet port, the second inlet port being in direct fluid communication with the interiors of the first plurality of porous hollow fiber membranes; and a third inlet port different from the first and second inlet ports, the third inlet port being in direct fluid communication with the exteriors of the first plurality of porous hollow fiber membranes and the exteriors of the second plurality of porous hollow fiber membranes. The housing can further include a first outlet port and a second outlet port different from the first outlet port. The first outlet port can be in direct fluid communication with the interiors of the second plurality of porous hollow fiber membranes, and the second outlet port can be in fluid communication with the interiors of the second plurality of porous hollow fiber membranes via pores in the second plurality of porous hollow fiber membranes. The second outlet port can be in direct fluid communication with the exteriors of the first plurality of porous hollow fiber membranes. The third inlet port can be in direct fluid communication with the exteriors of the first plurality of porous hollow fiber membranes. The housing can include a third inlet port different from the first and second outlet ports. The third inlet port can be in direct fluid communication with the interiors of the first plurality of porous hollow fiber membranes.

In some embodiments, the membrane module further includes: a first potting member; a second potting member different from the first potting member; a third potting member different from the first and second potting members; and a fourth potting member different from the first, second and third potting members. The first plurality of porous hollow fiber membranes is disposed in the first and second potting members but not in the third and fourth potting members, and the second plurality of porous hollow fiber membranes is disposed in the, first, second, third and fourth potting members.

In an aspect, the disclosure provides a membrane module that includes a housing. The housing includes: a first inlet port; a second inlet port different from the first inlet port; a third inlet port different from the first and second inlet ports; a first outlet port; a first plurality of porous hollow fiber membranes; and a second plurality of porous hollow fiber membranes different from the first plurality of porous hollow fiber membranes. Each of the first plurality of porous hollow fiber membranes includes an interior and an exterior. Each of the second plurality of porous hollow fiber membranes includes an interior and an exterior. The first inlet port is in direct fluid communication with the interiors of the second plurality of porous hollow fiber membranes. The second inlet port is in direct fluid communication with the interiors of the first plurality of porous hollow fiber membranes. The third inlet port is in direct fluid communication with the exteriors of the first plurality of porous hollow fiber membranes and the exteriors of the second plurality of porous hollow fiber membranes.

In some embodiments, the housing further includes a first outlet port and a second outlet port different from the first outlet port. The first outlet port is in direct fluid communication with the interiors of the second plurality of porous hollow fiber membranes. The second outlet port is in fluid communication with the interiors of the second plurality of porous hollow fiber membranes via pores in the second plurality of porous hollow fiber membranes. The second outlet port is in direct fluid communication with the exteriors of the first plurality of porous hollow fiber membranes. The third inlet port can be in direct fluid communication with the exteriors of the first plurality of porous hollow fiber membranes. The housing can include a third inlet port different from the first and second outlet ports. The third inlet port can be in direct fluid communication with the interiors of the first plurality of porous hollow fiber membranes. The first outlet port can be in fluid communication with the exteriors of the first plurality of porous hollow fiber membranes via pores in the second plurality of porous hollow fiber membranes.

In some embodiments, the membrane module further includes: a first potting member; a second potting member different from the first potting member; a third potting member different from the first and second potting members; and a fourth potting member different from the first, second and third potting members. The first plurality of porous hollow fiber membranes are disposed in the first and second potting members but not in the third and fourth potting members. The second plurality of porous hollow fiber membranes are disposed in the, first, second, third and fourth potting members.

In an aspect, the disclosure provides a method that includes simultaneously introducing three different fluids into hollow fiber membranes of a membrane module so that each of the three fluids simultaneously contact some of the same hollow fiber membranes so that a chemical reaction occurs between at least two of the fluids within the membrane module. Each of the three different fluids has a different flow path within the membrane module.

In some embodiments, one of the fluids includes a gas, and the method includes forming bubbles of the gas within the membrane module In some embodiments, a first fluid includes a gas, a second fluid includes an amine, and a third fluid includes a gas includes an acid. The method includes reacting the amine and the acid. The acid can include at least one member selected from the group consisting of hydrogen sulfide and carbon dioxide.

In an aspect, the disclosure provides a membrane module that includes a housing. The housing includes a first plurality of hollow fiber membranes, and a second plurality of hollow fiber membranes different from the first plurality of porous hollow fiber membranes. The membrane module is configured so that, during use of the membrane module, more than one separation simultaneously takes place in the membrane module.

In an aspect, the disclosure provides a method of using a membrane module. The method includes simultaneously using two different driving forces to affect a separation process within the membrane module.

In an aspect, the disclosure provides a system that includes: a first source configured to provide a first gas; a second source configured to provide a first liquid; a third source configured to provide a fluid; and a membrane module. The membrane module includes a housing. The housing includes: a first inlet port; a second inlet port different from the first inlet port; a third inlet port different from the first and second inlet ports; a first plurality of porous hollow fiber membranes; and a second plurality of porous hollow fiber membranes different from the first plurality of porous hollow fiber membranes. Each of the first plurality of porous hollow fiber membranes includes an interior and an exterior, and each of the second plurality of porous hollow fiber membranes includes an interior and an exterior. The first source is configured to provide the first gas to the interiors of the second plurality of porous hollow fiber membranes via the first inlet port. Pores in the second plurality of porous hollow fiber membranes are configured so that, during use of the system, some of the first gas within the interiors of the first plurality of porous hollow fiber membranes flows out of the second plurality of porous hollow fiber membranes via the pores in the second plurality of porous hollow fiber membranes.

In some embodiments, the system is configured so that, after flowing out of the second plurality of porous hollow fiber membranes via the pores in the second plurality of porous hollow fiber membranes, the first gas is between the exteriors of the first plurality of porous hollow fiber membranes and the exteriors of the second plurality of porous hollow fiber membranes. The second source can be configured to provide the first liquid to the exteriors of the first plurality of porous hollow fiber membranes and to the exteriors of the second plurality of porous hollow fiber membranes via the second inlet port. The first gas between the exteriors of the first plurality of porous hollow fiber membranes and the exteriors of the second plurality of porous hollow fiber membranes can be in the form of bubbles of the first gas which are disposed in the first liquid. The third source can be configured to provide the fluid to the interiors of the first plurality of porous hollow fiber membranes via the third inlet. The fluid can include a second liquid. The can further include a heater configured to heat the first liquid so that, within the module, the first liquid is hotter than the second liquid. The first liquid can include water, and the second includes water, with the second liquid having a higher purity than the first liquid. The fluid can include a second gas. The system can further include a pump configured to reduce a pressure of the fluid within the interiors of the first plurality of porous hollow fiber membranes.

In some embodiments, the system is configured to transfer water from the first liquid to the fluid with the module.

In some embodiments, the second plurality of porous hollow fiber membranes is longer than the first plurality of porous hollow fiber membranes.

In some embodiments, the system is configured so that: the first gas has a flow path through the module; the first liquid has a flow path through the module that is different from the flow path of the first gas through module; and the fluid has a flow path through the module that is different from both the flow path of the first gas through module and the flow path of the first liquid through the module.

In an aspect, the disclosure provides a system that includes: a first source configured to provide a first gas; a second source configured to provide a first liquid; a third source configured to provide a fluid; and a membrane module. The membrane module includes a housing. The housing includes: a first inlet port; a second inlet port different from the first inlet port; a third inlet port different from the first and second inlet ports; a first plurality of porous hollow fiber membranes; and a second plurality of porous hollow fiber membranes different from the first plurality of porous hollow fiber membranes. The system is configured so that: the first gas has a flow path through the module; the first liquid has a flow path through the module that is different from the flow path of the first gas through module; and the fluid has a flow path through the module that is different from both the flow path of the first gas through module and the flow path of the first liquid through the module.

In some embodiments: each of the first plurality of porous hollow fiber membranes includes an interior and an exterior; each of the second plurality of porous hollow fiber membranes includes an interior and an exterior; the first source is configured to provide the first gas to the interiors of the second plurality of porous hollow fiber membranes via the first inlet port; the second source is configured to provide the first liquid to the interiors of the first plurality of porous hollow fiber membranes via the second inlet port; and the third source is configured to provide the fluid to the exteriors of the first plurality of porous hollow fiber membranes via the third inlet port. The housing can further include a first outlet port and a second outlet port different from the first outlet port, and the system can be configured so that during use of the system: a first portion of the gas exits the module via the first outlet port; and a second portion of the gas exits the module via the second outlet port. The housing system can further include a third outlet port different from the first and second outlet ports, and the system can be configured so that during use of the system: the first liquid exits the module via the second outlet; and the fluid exits the module via the third outlet.

In some embodiments, the second plurality of porous hollow fiber membranes is longer than the first plurality of porous hollow fiber membranes.

In an aspect, the disclosure provides a method that includes simultaneously introducing three different fluids into porous hollow fiber membranes of a membrane module so that each of the three fluids simultaneously contact some of the same porous hollow fiber membranes so that water is transferred across the simultaneously contacted porous hollow fiber membranes from a first fluid of the three fluids to a second fluid of the three fluids. Each of the three different fluids has a different flow path within the membrane module.

In some embodiments, the first fluid includes a liquid, and a third fluid of the three fluids includes a gas. The method forms bubbles of the gas in the first liquid so that the first liquid contains the bubbles of the gas when the three fluids simultaneously contact the same porous hollow fiber membranes.

In some embodiments, the first fluid includes produced water or waste water.

In some embodiments, the method is a water desalination method.

In an aspect, the disclosure provides a system, including: a first source configured to provide a first gas, the first gas including oxygen gas; a second source configured to provide a second gas, the second gas including sulfur dioxide; a third source configured to provide a liquid including water; and a membrane module. The membrane module includes a housing. The housing includes a plurality of porous hollow fiber membranes. The system is configured so that, within the module, the sulfur dioxide reacts with the water to form products that undergo oxidation and neutralization to remove the sulfur dioxide from the second gas.

In some embodiments, the water includes seawater.

In some embodiments, the plurality of porous hollow fiber membranes includes a first plurality of porous hollow fiber membranes and a second plurality of porous hollow fiber membranes different from the first plurality of porous hollow fiber membranes.

In some embodiments, at least one of the following holds: the first plurality of porous hollow fiber membranes includes a hydrophobic material, and the second plurality of porous hollow fiber membranes includes a hydrophobic material; the first plurality of porous hollow fiber membranes includes a hydrophobic material, and the second plurality of porous hollow fiber membranes includes a hydrophobic coating supported by another material; the first plurality of porous hollow fiber membranes includes a hydrophobic coating supported by another material, and the second plurality of porous hollow fiber membranes includes a hydrophobic coating supported by another material; and at least one member selected from the group consisting of the first plurality of hollow fiber membranes and the second plurality of hollow fiber membranes includes a hydrophobic material, and the hydrophobic material includes at least one member selected from the group consisting of a polymeric material, a metallic material, a ceramic material, and a hybrid composite coated hydrophobic material. The second plurality of porous hollow fiber membranes can be longer than the first plurality of porous hollow fiber membranes. The system can further include: a first inlet port; a second inlet port different from the first inlet port; and a third inlet port different from the first and second inlet ports. Each of the first plurality of porous hollow fiber membranes can include an interior and an exterior. Each of the second plurality of porous hollow fiber membranes can include an interior and an exterior. The first source can be configured to provide the first gas to the interiors of the second plurality of porous hollow fiber membranes. Pores in the second plurality of porous hollow fiber membranes can be configured so that, during use of the system, some of the first gas within the interiors of the first plurality of porous hollow fiber membranes flows out of the second plurality of porous hollow fiber membranes via the pores in the second plurality of porous hollow fiber membranes. The system can be configured so that, after flowing out of the second plurality of porous hollow fiber membranes via the pores in the second plurality of porous hollow fiber membranes, the first gas is between the exteriors of the first plurality of porous hollow fiber membranes and the exteriors of the second plurality of porous hollow fiber membranes. The second source can be configured to provide the second gas to the interiors of the first plurality of porous hollow fiber membranes via the second inlet, and the third source can be configured to provide the liquid to the exteriors of the first plurality of porous hollow fiber membranes and to the exteriors of the second plurality of porous hollow fiber membranes via the second inlet. The system can be configured so that, during use of the system, the sulfur dioxide reacts with water at pores in the first plurality of porous hollow fiber membranes. The system can be configured so that, during use of the system, the products of the reaction of the sulfur dioxide and water undergo oxidation and neutralization between the exteriors of the first plurality of porous hollow fiber membranes and to the exteriors of the second plurality of porous hollow fiber membranes. The system can be configured so that: the first gas has a flow path through the module; the second gas has a flow path through the module that is different from the flow path of the first gas through module; and the liquid has a flow path through the module that is different from both the flow path of the first gas through module and the flow path of the second gas through the module.

In an aspect, the disclosure provides a system, including: a first source configured to provide a first gas, the first gas including oxygen gas; a second source configured to provide a second gas, the second gas including sulfur dioxide; a third source configured to provide a liquid including water; and a membrane module. The membrane module includes a housing which includes a plurality of porous hollow fiber membranes. The system is configured so that: the first gas has a flow path through the module; the second gas has a flow path through the module that is different from the flow path of the first gas through module; and the liquid has a flow path through the module that is different from both the flow path of the first gas through module and the flow path of the second gas through the module.

In some embodiments, the plurality of porous hollow fiber membranes includes a first plurality of porous hollow fiber membranes and a second plurality of porous hollow fiber membranes different from the first plurality of porous hollow fiber membranes.

The second plurality of porous hollow fiber membranes can be longer than the first plurality of porous hollow fiber membranes.

In some embodiments, the module further includes: a first inlet port; a second inlet port different from the first inlet port; a third inlet port different from the first and second inlet ports. Each of the first plurality of porous hollow fiber membranes includes an interior and an exterior. Each of the second plurality of porous hollow fiber membranes includes an interior and an exterior. The first source is configured to provide the first gas to the interiors of the second plurality of porous hollow fiber membranes. Pores in the second plurality of porous hollow fiber membranes are configured so that, during use of the system, some of the first gas within the interiors of the first plurality of porous hollow fiber membranes flows out of the second plurality of porous hollow fiber membranes via the pores in the second plurality of porous hollow fiber membranes. The system can be configured so that, after flowing out of the second plurality of porous hollow fiber membranes via the pores in the second plurality of porous hollow fiber membranes, the first gas is between the exteriors of the first plurality of porous hollow fiber membranes and the exteriors of the second plurality of porous hollow fiber membranes. The second source can be configured to provide the second gas to the interiors of the first plurality of porous hollow fiber membranes via the second inlet. The third source can be configured to provide the liquid to the exteriors of the first plurality of porous hollow fiber membranes and to the exteriors of the second plurality of porous hollow fiber membranes via the second inlet. The system can be configured so that, during use of the system: the sulfur dioxide reacts with water at pores in the first plurality of porous hollow fiber membranes; and the products of the reaction of the sulfur dioxide and water undergo oxidation and neutralization between the exteriors of the first plurality of porous hollow fiber membranes and to the exteriors of the second plurality of porous hollow fiber membranes.

In an aspect, the disclosure provides a method that includes simultaneously introducing a first gas including sulfur dioxide, a second gas including oxygen gas, and water into hollow fiber membranes of a membrane module so that, within module, sulfur dioxide is removed from the first gas. Each of the first gas, the second gas and the water has a different flow path within the membrane module.

In some embodiments, the method further includes reacting the sulfur dioxide and water at pores of the hollow fiber membranes, thereby forming products. The method can further include oxidizing and neutralizing the products within the module.

In some embodiments, the first gas includes flue gas.

DETAILED DESCRIPTION

Hollow Fiber Membrane Module

Figure 1A:
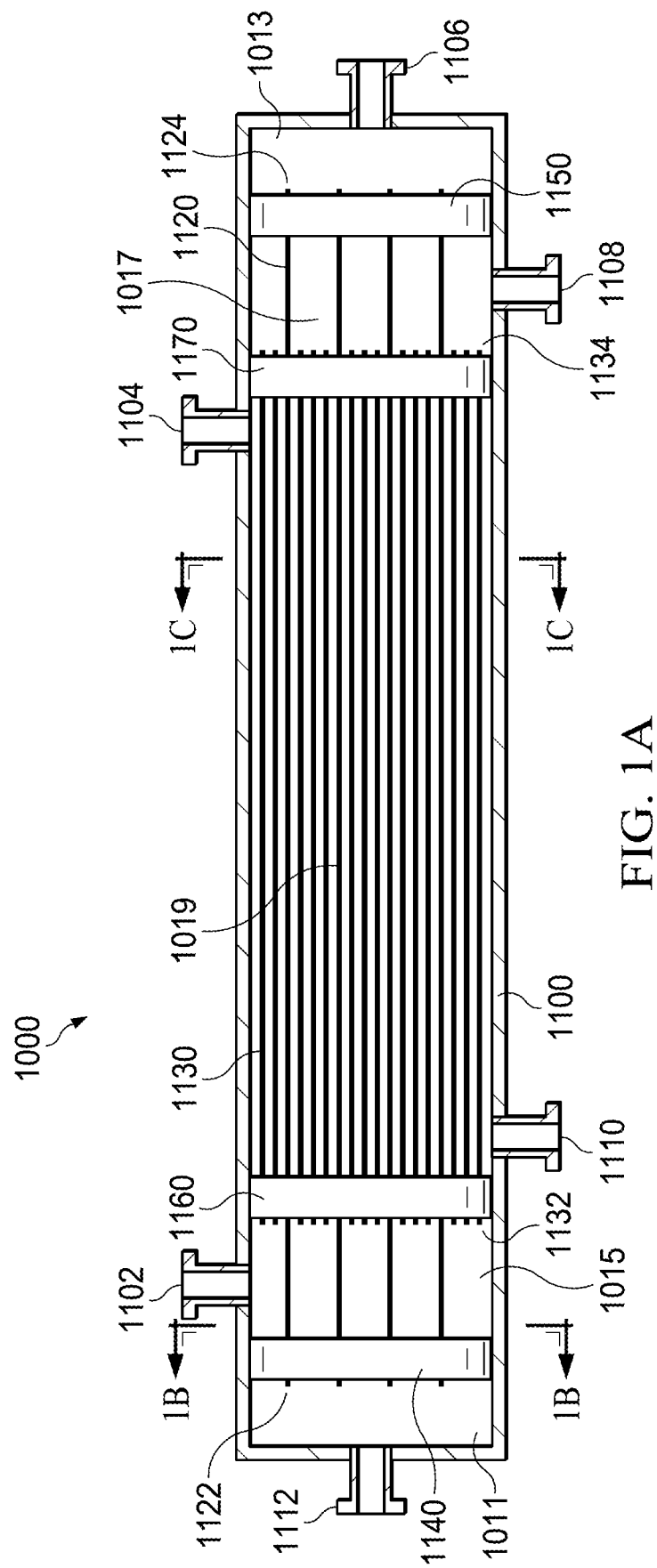
FIG. 1A is a schematic perspective view of an embodiment of a hollow fiber membrane module.

FIG. 1A is a schematic perspective view of an embodiment of a hollow fiber membrane module 1000 which includes a housing 1100 having six different ports 1102-1112, respectively. In general, the module 1000 can have any desired length. In some embodiments, the module 1000 has a length of from 20 centimeters to two meters. The module 1000 also includes longer hollow fiber membranes 1120 and shorter hollow fiber membranes 1130. The distal regions of the longer membranes 1120 are disposed in potting materials 1140 and 1150. One end 1122 of each longer membrane 1120 extends beyond the potting material 1140 and into a region 1011 of the module 1000, and the other end 1124 of each longer membrane 1120 extends beyond the potting material 1150 and into a region 1013 of the module 1000. The distal regions of the shorter membranes 1130 are disposed in potting materials 1160 and 1170. The longer membranes 1120 are also disposed in the potting materials 1160 and 1170. One end 1132 of each of the shorter membranes 1130 extends beyond the potting material 1160 and into a region 1015 and of the module 1000, and the other end 1134 of each of the shorter membranes 1130 extends beyond the potting material 1170 and into a region 1017 of the module 1000. The module 1000 also includes a region 1019 that contains both the membranes 1120 and the membranes 1130.

Figure 2A:
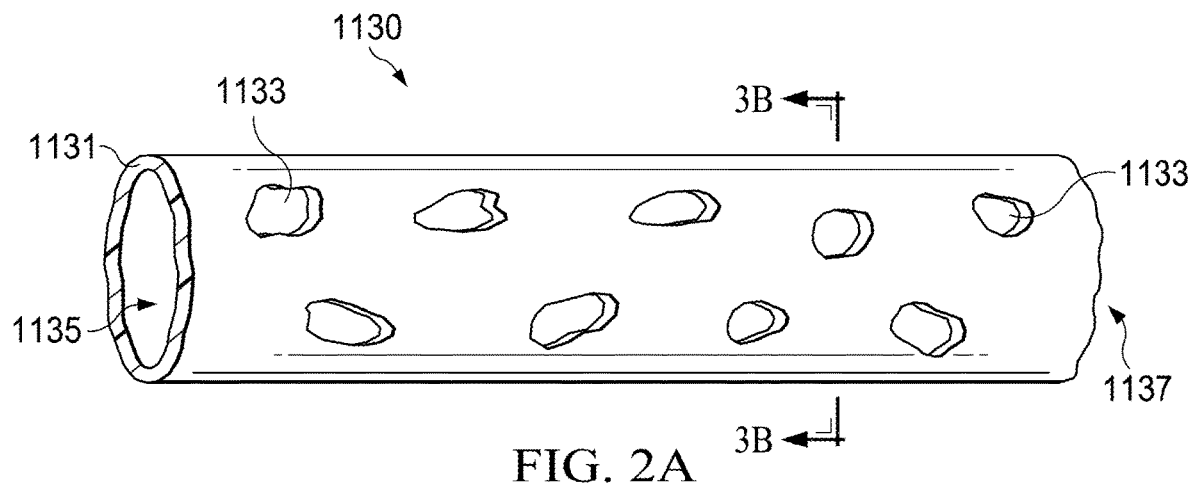
FIG. 2A is a schematic perspective view of a hollow fiber membrane.
Figure 2B:
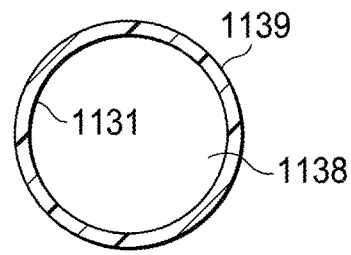
FIG. 2B is a schematic cross-sectional view of the hollow fiber membrane of FIG. 2A taken along line 2B.

FIGS. 2A and 2B are a partial schematic perspective and a cross-sectional view of a hollow fiber membrane 1130 that includes a wall 1131 with pores 1133, a first open end 1135, and a second open end 1137 such that the wall 1131 defines an interior 1138 of the fiber 1130 and an exterior 1139 of the fiber 1130.

The design of the hollow fiber membranes 1120 is generally the same as that of the hollow fiber membranes 1130, but the membranes 1120 are shorter than the membranes 1130. In general, membranes 1120 and 1130 are made from the same materials, but in some embodiments they can be made of different materials. Generally, membranes 1120 and 1130 have the same features (e.g., pore size, inner diameter, outer diameter) discussed below. However, in some embodiments, the membranes 1120 can have one or more different features from the membranes 1130.

While certain embodiments have been described, the disclosure is not limited to such embodiments. In some embodiments, the fiber membranes 1130 can be porous or dense, and/or the hollow fiber membranes 1120 can be porous or dense. In some embodiments, whether the hollow fiber membranes 1130 and/or the hollow fiber membranes 1120 are porous or dense can depend upon the process or application of the module 1100. In certain embodiments, for gas separation, the hollow fiber membranes 1130 can be integrally skinned asymmetric hollow fiber membranes or defect-free composite hollow fiber membranes, and the hollow fiber membranes 1120 can be porous hollow fiber membranes. In some embodiments, the hollow fiber membranes 1120 can be porous, and the hollow fiber membranes 1130 can be defect-free asymmetric hollow fiber membranes or composite hollow fiber membranes.

Generally, the material from which a hollow fiber membrane is made can be selected as desired. In some embodiments, a hollow fiber membrane is made of a hydrophobic material. Typically, a hydrophobic material has a relatively low surface tension and/or a relatively low surface energy characteristic. In some embodiments, a hollow fiber membrane is formed of a hydrophobic organic material, such as a polymer. Examples of polymers include polysulfone (PSF), polyethersulfone (PES), polyvinylidenedifluoride (PVDF), polyacrylonitrile (PAN), polytetrafluoroethylene (e.g., Teflon), polyamide-imide (PAI), polyimide (PIs), co-polyimide, polyethylene (PE), polypropylene (PP), cellulose acetate (CA), Polyetheretherketone (PEEK), polybenzimidazole (PBI) and blended or modified forms of such polymers. In certain embodiments, a hollow fiber membrane is formed of an inorganic material, such as a metal-containing material, palladium, silver or an alloy), a ceramic material (e.g., various oxides of alumina, titania or zirconia), a glass (e.g., silicon oxide or silica), a zeolite, or an inorganic carbon material. In some embodiments, a hollow fiber membrane is formed of a mixed matrix material, such a material that is a mixture of an inorganic material and a polymeric material. While certain materials have been described, the disclosure is not limited in this manner. As an example, in some embodiments, a hollow fiber can be formed of a material (e.g., a hydrophilic material) that is later coated with a hydrophobic material (e.g., such as a material mentioned above). Such a hollow fiber can be prepared according to any desired process. Examples of processes that can be used include co-extrusion and deposition (e.g., vapor deposition).

While embodiments have been described in which a hollow fiber membrane is hydrophobic, in certain embodiments, a hollow fiber membrane can be made of a hydrophilic material. For example, as explained below, compressed gas (e.g., air) flows along the interiors of certain membranes. In some embodiments, such membranes can be made of a hydrophilic material. In general, the material from which a given hollow fiber membrane is made depends on the use of the hollow fiber membrane. In some embodiments, as discussed herein, it is desirable for a given hollow fiber membrane to be made of a hydrophobic material. However, in certain embodiments, for example when hydrophobic properties of a given hollow fiber membrane are not directly relevant to the use of the hollow fiber membrane, the hollow fiber membrane can be made of a hydrophilic material.

Generally, the size of a hollow fiber membrane can be selected as desired. Typically, when used in a gas process, the membrane will tend to be longer than when used in a liquid process. The ratio of the length of the relatively long hollow fiber membranes to the length of the relatively short hollow fiber members can, as a general matter, be selected as desired. In some embodiments, the relatively long hollow fiber membranes are at least 1.1 (e.g., at least 1.2, at least 1.5, at least 2) times longer than the relatively short hollow fiber membranes. In general, the inner and outer diameters of the wall of a hollow fiber membrane can be selected as desired. In some embodiments, the inner diameter of the wall of a hollow fiber membrane is at least about 60 μm (e.g., at least about 75 μm, at least about 100 μm) and/or at most about 600 μm (e.g., at most about 500 μm, at most about 250 μm). In certain embodiments, the outer diameter of the wall of a hollow fiber membrane is at least about 500 μm (e.g., at least about 750 μm) and/or at most about 1 mm (e.g., at most about 1.5 mm). In some embodiments, the ratio of the inner wall diameter to the outer wall diameter of a hollow fiber membrane is at least about 1.2 (e.g., at least about 1.5) and/or at most about 3 (e.g., at most about 2.5).

In general, the average size of the pores in the wall of a hollow fiber membrane can be selected as desired. In some embodiments, the pores have an average size of at least 0.02 μm (e.g., at least 0.1 μm, at least 0.5 μm) and/or at most 2 μm (e.g., at most 1.5 μm, at most 1 μm). In certain embodiments, the pores have an average size of from 0.02 μm to 2 μm (e.g., from 0.1 μm to 1.5 μm).

Generally, the average surface porosity of a hollow fiber membrane can be selected as desired. In some embodiments, the pores form at least 5% (e.g., at least 10%, at least 20%) and/or at most 60% (at most 50%, at most 40%) of the area of the surface area of the wall of a hollow fiber membrane. In certain embodiments, the pores form from 5% to 60% (e.g., from 10% to 60%) of the area of the surface area of the wall of a hollow fiber membrane.

In general, the overall porosity of the cross-sectional pores in the wall of a hollow fiber membrane can be selected as desired. In some embodiments, the overall porosity of the cross-sectional pores of a hollow fiber membrane is at least 30% (e.g., at least 40%, at least 50%) and/or at most 90% (e.g., at most 80%, at most 70%). In certain embodiments, the overall porosity of the cross-sectional pores of a hollow fiber membrane is from 30% to 90% (e.g., from 40% to 90%).

When a liquid stream flows along the exterior of a hollow fiber membrane, gas that flow through the pores in the wall of the hollow membrane can form gas bubbles in the liquid stream. In some embodiments, the gas bubbles include microbubbles and/or nanobubbles. In certain embodiments, the gas bubbles have an average size of at least 50 μm (e.g., at least 100 μm, at least 150 μm) and/or an average size of at most 300 μm (e.g., at most 250 μm, at most 200 μm). In some embodiments, the bubbles have an average size of from 50 μm to 300 μm.

Without wishing to be bound by theory, it is believed that the bubble size can be controlled by taking into consideration the drag force (which can depend on the liquid velocity and liquid flow rate) and the capillary force (which can depend on the gas pressure and the pore size) and compressed gas flow rate in given membrane surface porosity. It is believed that this information can be used to (empirically and/or theoretically) optimize mass transfer of a given feed stream to improve performance of the membrane distillation system.

Method of Making a Hollow Fiber Membrane Module

In general, a hollow fiber membrane module can be according to any appropriate method. In some embodiments, a method of making a hollow fiber membrane module includes: (1) bundling both the longer and shorter membranes; (2) plugging the ends of the shorter membranes; (3) potting the shorter membranes; (4) removing the plugging agent; (5) potting the longer membranes; (6) cutting the longer membranes; and (7) capping the module.

Figure 3A:
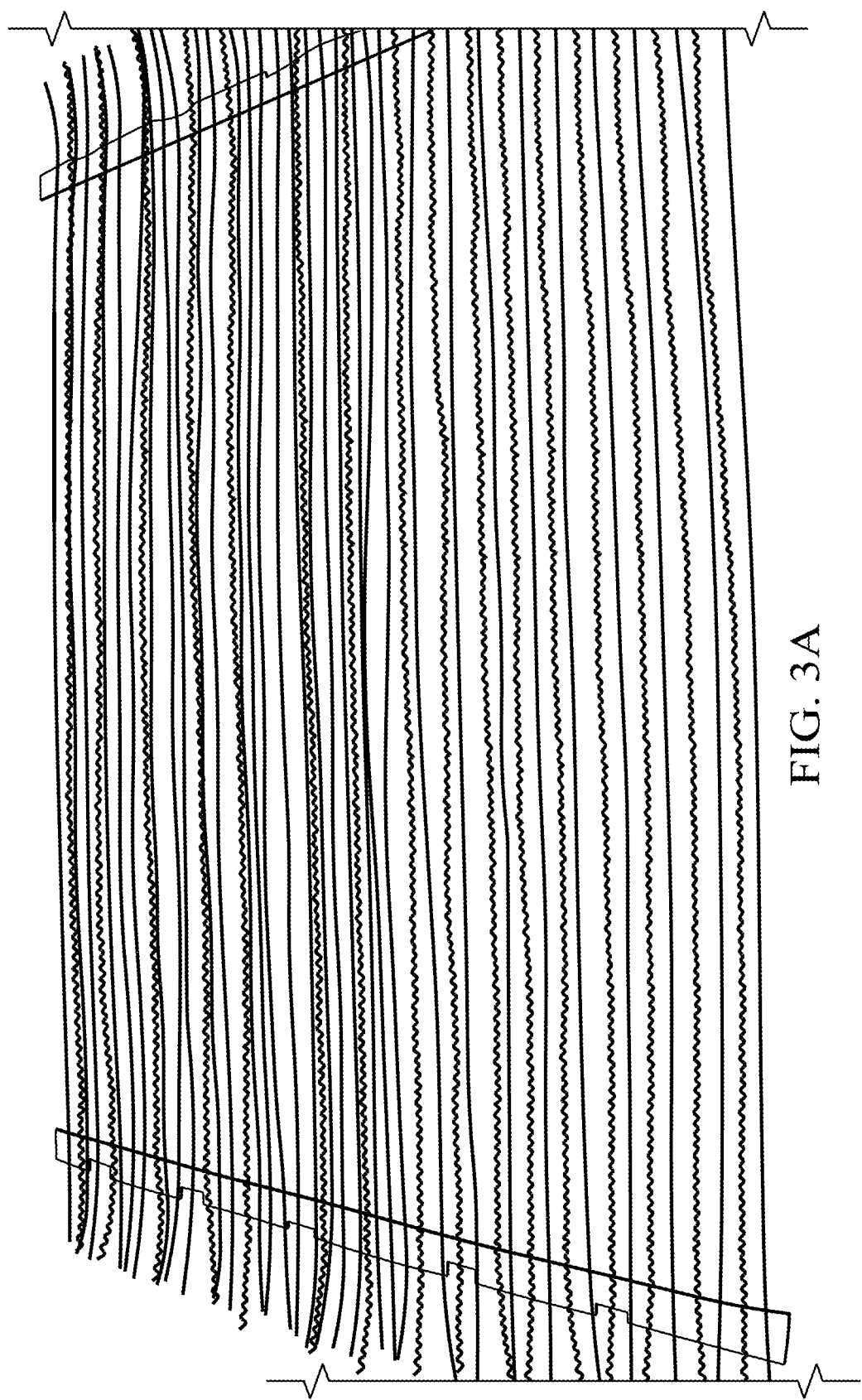
FIGS. 3A and 3B schematically show the results of different steps of a hollow fiber membrane bundling method.
Figure 3B:
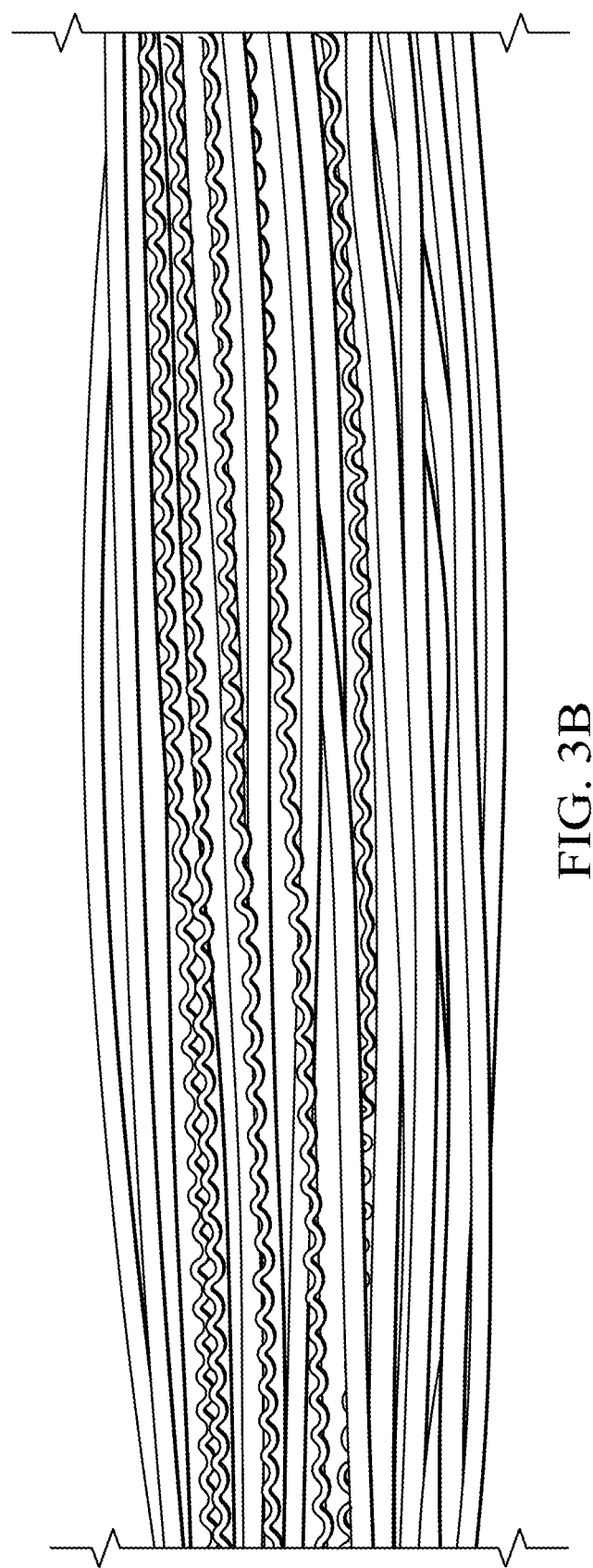

Generally, bundling of both types of hollow fibers can be performed as desired. In certain embodiments, bundling includes providing the relatively long hollow fiber membranes as wavy hollow fiber membranes and providing the relatively short hollow fiber membranes as straight hollow fiber membranes. Referring to FIGS. 3A and 3B, a uniform dispersion of two different types of hollow fiber membranes are disposed on tape, followed by rolling both sides of the tape to provide a rounded bundle containing both types of hollow fiber membranes. The bundle is inserted into the housing for the module, which completes the bundling part of the process.

To avoid filling either end of the longer hollow fiber membranes with potting material during a subsequent process step in which the longer membranes are potted, it is generally desirable for both ends of the longer membranes to be blocked before they are potted. Typically, such blocking can be performed as desired before potting the longer membranes. For example, both ends of the longer membranes can be blocked before, during or after the bundling step. In general, the ends of the longer membranes can be blocked according to any appropriate method. In some embodiments, the ends of the longer membranes are blocked with a meltable and or crosslinkable setting material, such a fast curing glue or a wax, such as candle wax. As an example, the blocking material can be paraffin. In such embodiments, the fiber ends are disposed in the melted material, after which the fiber ends are removed from the material and the material is allowed to cool to solidify inside the fiber ends. In some embodiments, paraffin wax is used as the material to block the ends of the longer hollow fiber membranes.

Figure 4A:
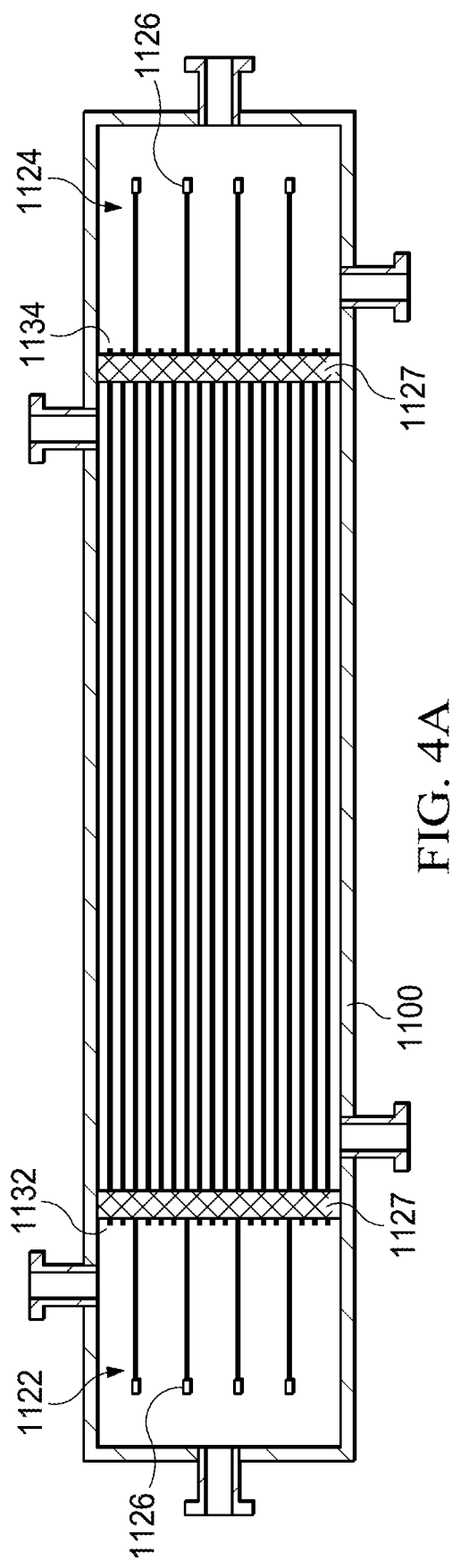
FIGS. 4A-4F schematically show the results of different steps of a method of making a hollow fiber membrane module.

FIG. 4A shows the housing 1100 containing tape strips 1127 surrounding the bundle of hollow fiber membranes in which the ends 1122 and 1124 of the longer membranes 1120 are blocked with a material 1126. For reasons explained below, the ends of the shorter hollow fiber membranes extend beyond the tape strips 1127.

Figure 4B:
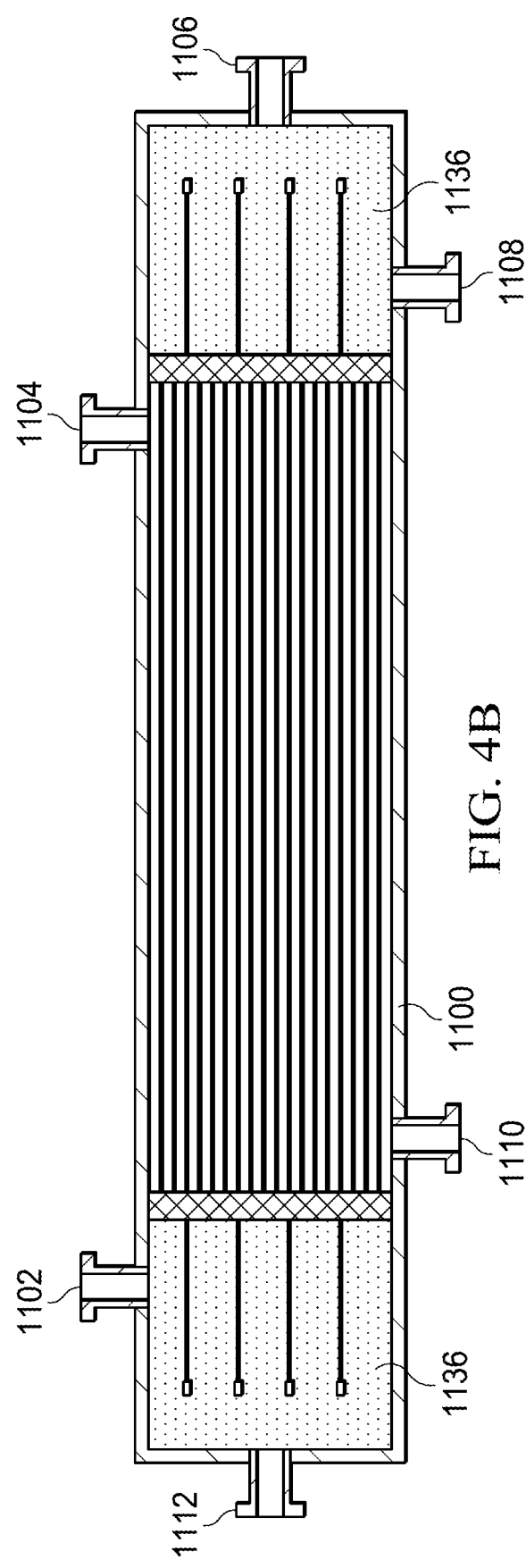

To avoid filling either end of the shorter hollow fiber membranes with potting material during a subsequent process step in which the shorter membranes are potted, it is generally desirable for the ends 1132 and 1134 of the shorter membranes 1130 to be blocked before they are potted. In general, the shorter membranes 1130 can be blocked using any appropriate process. Referring to FIG. 4B, in some embodiments, this is achieved by introducing a plugging agent 1136 in its liquid state into the housing 1100 through ports 1106 and 1112, respectively (or through ports 1102 and 1108, respectively). Generally, any appropriate material can be used as a plugging agent. In some embodiments, the plugging agent is a material that changes from liquid to solid with relatively little cooling can be used as plugging agent. Examples of plugging materials include gelatin and some types of carrageenan. Gelling kappa-carrageenan (κ-CGN) and iota-carrageenan (ι-CGN) typically involves a heat-cool cycle and the presence of certain salts (e.g., potassium ions for κ-CGN, calcium ions for ι-CGN). Relatively hot solutions of κ-CGN and ι-CGN set when cooled below their gel temperatures, which are between 30 and 70° C. depending on the carrageenan type and the concentration of cations present. In general, κ-CGN forms a relatively rigid and strong gel with potassium salts while using calcium salts results in a relatively brittle gel. In certain embodiments, a viscous solution of the potting material (e.g., k-CGN) is poured into the module through the end ports, respectively. The viscous solution is allowed to cool (e.g., to room temperature) to form into a gel of the plugging agent 1136 that blocks both ends 1132 and 1134 of the shorter hollow fiber membranes 1130.

Figure 4C:
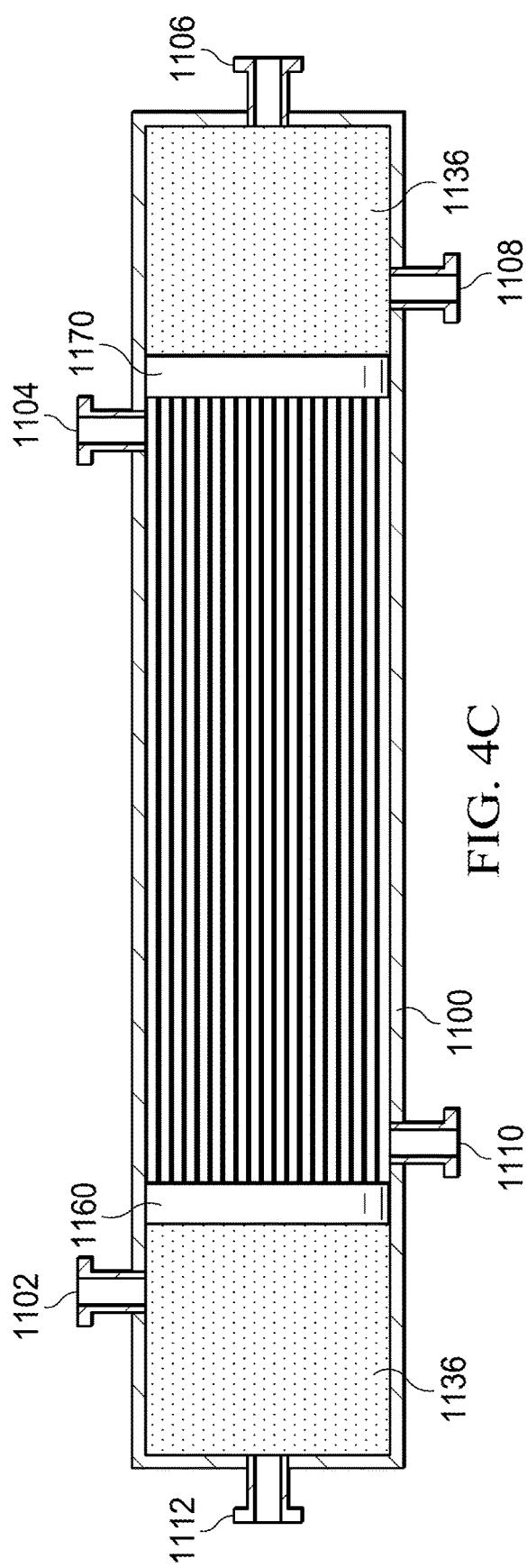

Referring to FIG. 4C, the shorter hollow fiber membranes 1130 are subsequently potted within the housing 1000. In some embodiments, the potting material 1160 and 1170 in liquid form is introduced through the ports 1104 and 1110, respectively. This can be done simultaneously or in a stepwise fashion. In certain embodiments, a centrifugal potting machine is used to inject the liquid potting material such that it fills in between the fiber membranes 1120 and 1130 and the housing 1100 in a leak-free manner, after which the potting material 1160 and 1170 is solidified (e.g., cured). In general, any appropriate potting material can be used, e.g., cements, waxes and resins. In some embodiments, the potting material is selected from resins, epoxies, phenolaldehydes, acrylic resins, polysiloxanes, polyurethanes and fluorocarbons. In certain embodiments, fluorocarbons are used because they are relatively inert to solvents and chemical corrosion, and settling characteristics, while also being able to achieve a fluid-tight seal.

Figure 4D:
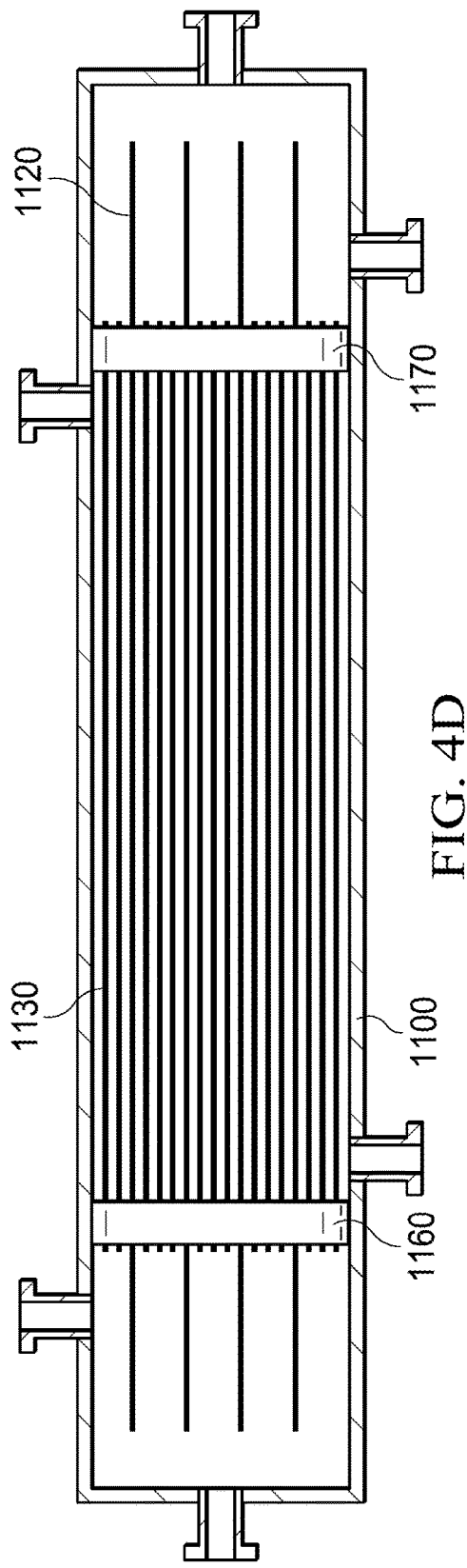

Referring to FIG. 4D, after solidification of the potting material 1160 and 1170, the plugging agent 1136 is removed from the housing 1100 to expose open ends 1132 and 1134 of the shorter hollow fiber membranes 1130. In some embodiments, the plugging agent transitions from solid to liquid with a relatively small change in temperature. In such embodiments, appropriate heat is applied to the plugging agent so that it returns to its liquid state, and the liquid plugging agent is removed from the module. In certain embodiments, such as when the plugging agent is carrageenan, hot water is used to convert the solid plugging agent into an aqueous solution which is washed out of the module. Subsequently, the module can be dried if desired.

Figure 4E:
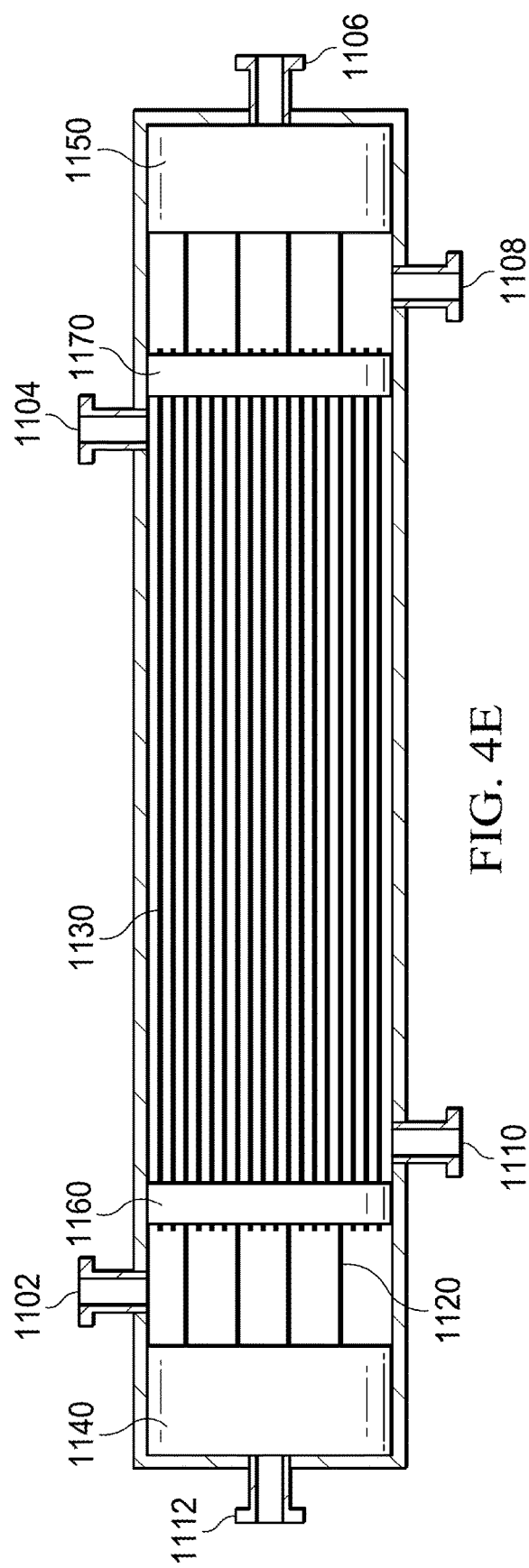

Referring to FIG. 4E, a potting step is performed to pot the longer hollow fiber membranes. This potting step is similar to the potting step discussed above for the shorter hollow fiber membranes, except that the potting material 1140 and 1150 and is introduced into the housing 1110 through the ports 1106 and 1112, respectively (or through ports 1102 and 1108, respectively), for potting the longer membranes 1120.

Figure 4F:
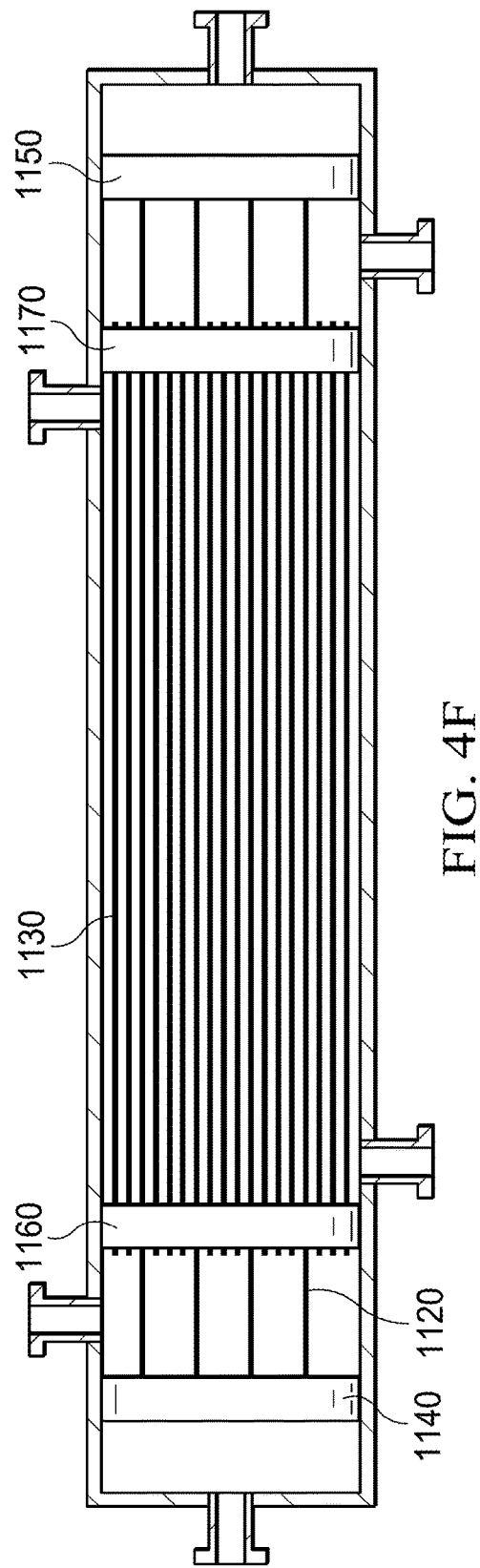

Referring to FIG. 4F, after the potting material 1140 and 1150 for the longer membranes 1120 is properly solidified (e.g., cured), part of the potting material is removed to expose open ends of the longer hollow fiber membranes. In general, removing the part of the potting material can be achieved in any appropriate manner. In some embodiments, the part of the potting material is removed using a mechanical cutter. Afterward, a cap is connected to the module.

Figure 1B:
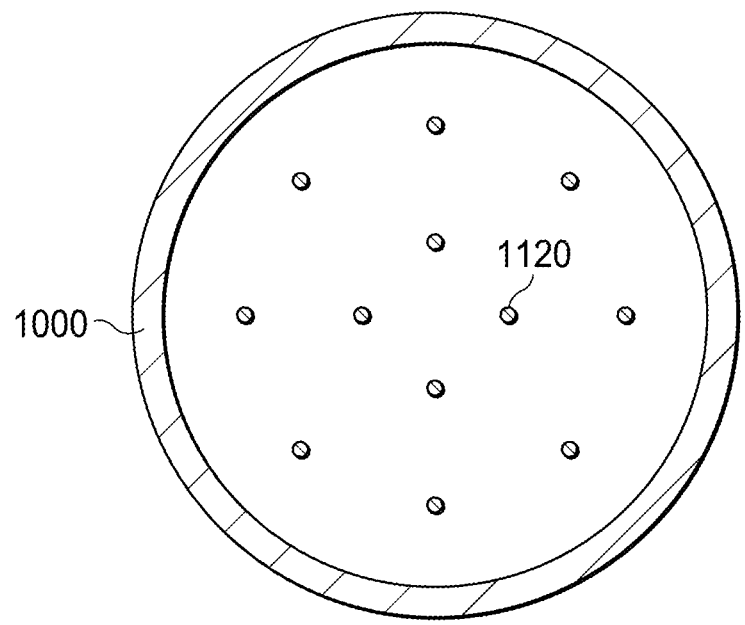
FIG. 1B is a schematic cross-sectional view of the hollow fiber membrane module taken alone line 1B-1B in FIG. 1A.
Figure 1C:
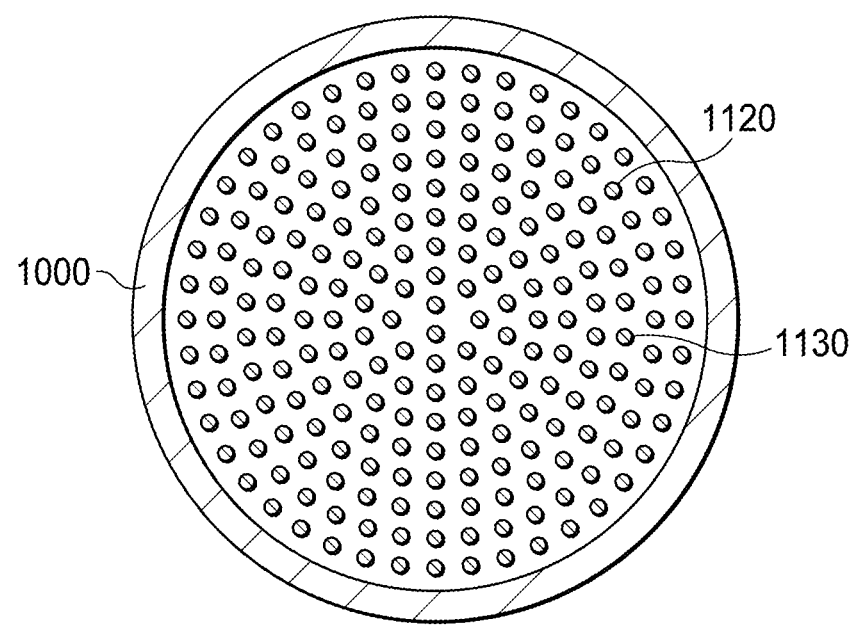
FIG. 1C is a schematic cross-sectional view of the hollow fiber membrane module taken alone line 1C-1C in FIG. 1A.

The result of this process is the hollow fiber membrane module 1000 shown in FIGS. 1A-1C.

Although embodiments a process for making a hollow fiber membrane module is disclosed above, the disclosure is not limited to such a process. In general, any desired process can be used to make such a module. In some embodiments, an automated process can be used.

Methods of Using the Hollow Fiber Membrane Module
General

Referring to FIGS. 1A-1C, in some embodiments, during use of the module 1000, gas (e.g., air) is supplied to the module 1000 via the port 1112 (or the port 1106) so that the gas (e.g., air) flows into the interiors of the longer hollow fiber membranes 1120. At the same time, a first liquid is supplied to the module 1000 via the port 1108 (or the port 1102) so that the first liquid flows into the interiors of the shorter hollow fiber membranes 1130. Also at the same time, a second liquid is supplied to the module via the port 1110 (or the port 1104) so that the second liquid flows along the exteriors of both the longer membranes 1120 and the shorter membranes 1130.

Referring to FIGS. 2A and 2B, as the gas (e.g., air) flows within the interior of a longer hollow fiber membrane 1120, some of the gas (e.g., air) leaves through the pores in the wall in the form of gas (e.g., air) bubbles that becomes contained in the first liquid stream or in the second liquid stream.

Figure 5A:
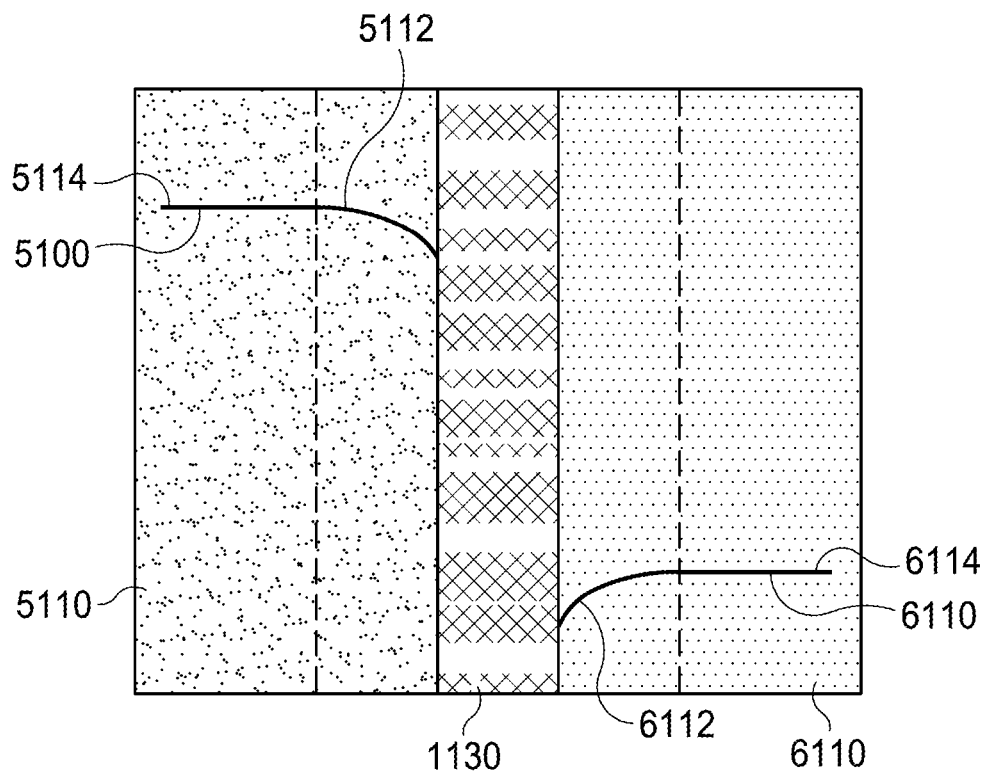
FIGS. 5A and 5B schematically depict a potential impact of gas bubbles in a liquid stream.
Figure 5B:
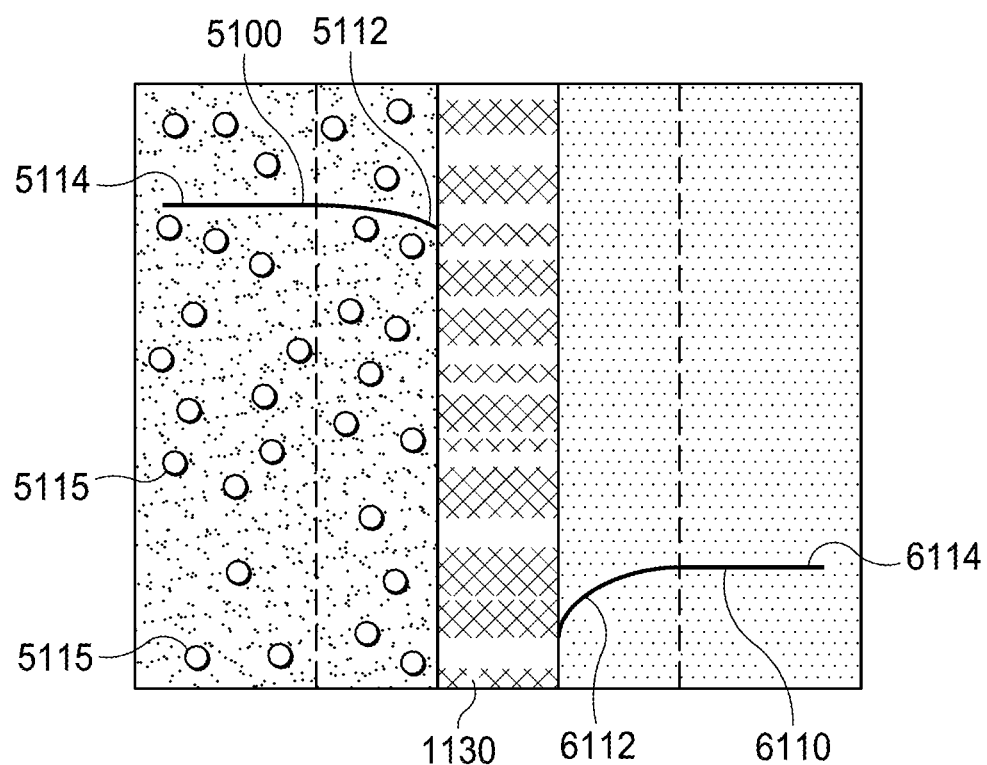

Without wishing to be bound by the subject matter shown in FIGS. 5A and 5B, these figures schematically depict an impact that is believed to be due to the presence of gas (e.g., air) bubbles present in a liquid stream. FIG. 5A schematically shows that, in the absence of gas (e.g., air) bubbles in the liquid stream 5110, there is a relatively large amount of concentration polarization 5100 in the liquid stream 5110 due to the relatively large difference between the bulk concentration 5114 of the liquid stream and the concentration 5112 of the liquid stream at the surface of the membrane 1130. Another stream is depicted on the opposite side of the membrane 1130 with corresponding features to the liquid stream but beginning with the number 6 rather than the number 5.0 FIG. 5B schematically shows that, in the presence of gas (e.g., air) bubbles 5115 in the liquid stream 5110, there is a relatively small amount of concentration polarization 5100 in the liquid stream due to the relatively small difference between the bulk concentration 5114 of the liquid stream and the concentration 5112 of the liquid stream at surface of the membrane 1130. It is believed that gas (e.g., air) bubbles also enhance mass transfer and reduce temperature polarization in the liquid stream 5110 (FIG. 5B) relative to the situation where the liquid stream 5110 does not contain gas (e.g., air) bubbles (FIG. 5A).

Alternatively or additionally, the gas bubbles can act as a reactant in one or more chemical reactions within the module. This can, for example, avoid performing the chemical reaction(s) outside the module, which can reduce the complexity and/or cost associated with performing the process. This is discussed in more detail below, for example, with respect to flue gas desulfurization.

Acid Gas Removal

In some instances, a gas, such as natural gas or a gas mixture, contains undesirable amounts of hydrogen sulfide ($H_2S$), carbon dioxide ($CO_2$), and/or one or more other acidic gases. These undesirable and acidic gases are referred to as acid gas. It is common to remove the acid gas by reacting it with an amine-containing liquid via an acid-base reaction. The reaction products are ions (e.g., protonated amine, $HS^-$, $HCO_3^-$) that dissolved in the liquid and a relatively pure gas, such as relatively pure natural gas. Examples of amines that can be used include diethanolamine (DEA), monoethanolamine (MEA), methyldiethanolamine (MDEA), diisopropanolamine (DIPA), and aminoethoxyethanol diglycolamine (DGA). Afterward, the liquid stream can be exposed to appropriate processes to effectively reverse the chemical reaction to yield the amine and acid gas so that amine can be re-used.

Figure 6:
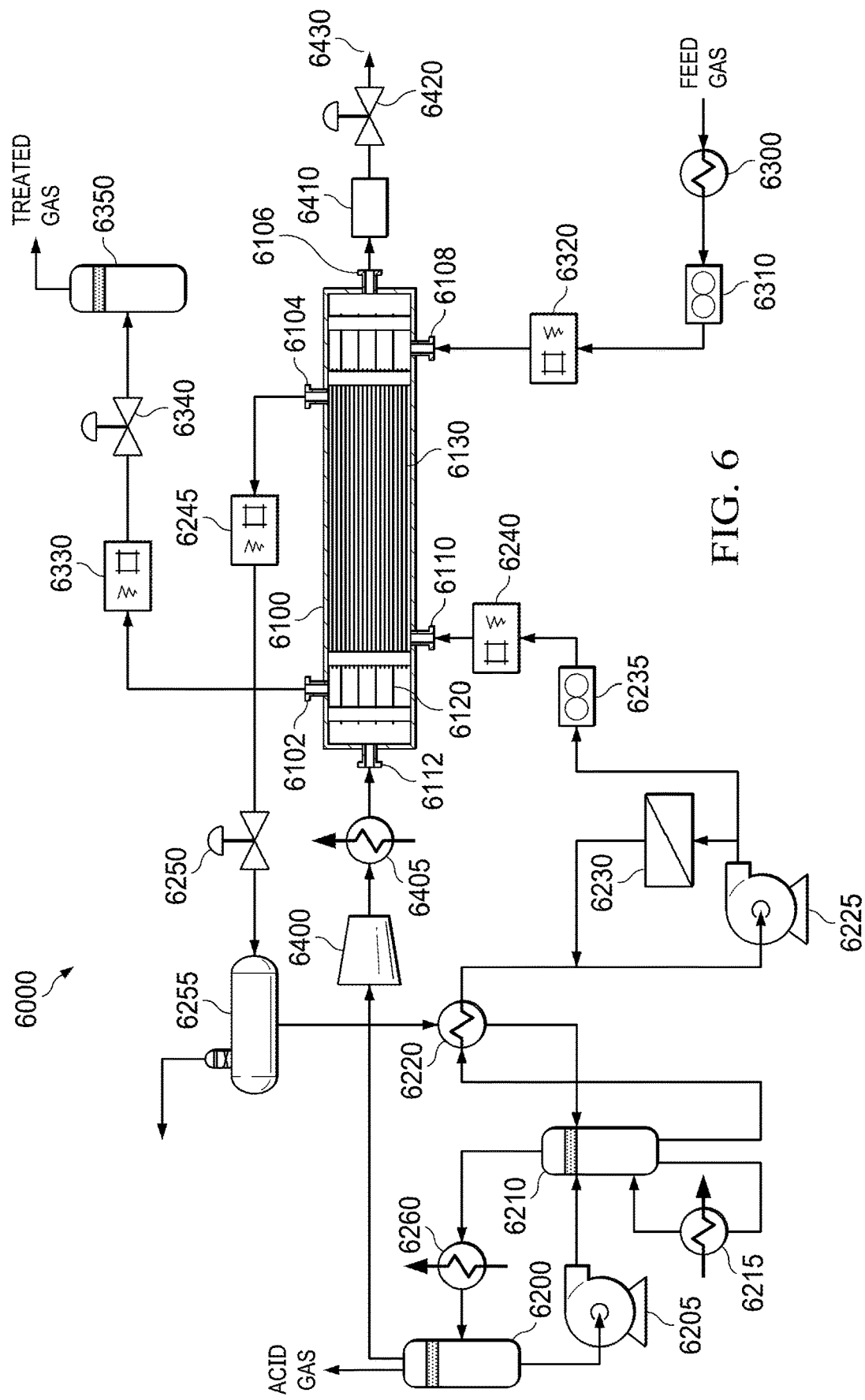
FIG. 6 is a schematic drawing of system that uses a hollow fiber membrane module for acid gas removal.

FIG. 6 is a schematic drawing of system 6000 configured to use a hollow fiber membrane module 6100 for acid gas removal. The module 6100 includes six ports, 6102-6112, respectively, a plurality of longer hollow fiber membranes 6120 and a plurality of shorter hollow fiber membranes 6130. The system includes three fluid streams: 1) a liquid absorbent stream which is a liquid (e.g., water) containing an amine when it enters the module 6100; 2) a feed stream which is a gas that contains acid-gas, such natural gas that contains acid gas, when it enters the module 6100; and 3) part of acid gas from 6200 after temperature controlling (cooling). Each stream is enters the module 6100 through a respective port.

The sequence of the components along the flow path of the liquid absorbent stream is a tank 6200, a reflux pump 6205, a tank 6210, optionally a stripper reboiler 6215, a heat exchanger 6220, an absorbent circulation pump 6225, optionally a solution filter 6230, a flow meter 6235, a module 6240 with a temperature monitor and a pressure monitor, the port 6110, along the exteriors of both the membranes 6120 and the membranes 6130, the port 6104, a module 6245 with a temperature monitor and a pressure monitor, a back pressure regulator 6250, a flash drum 6255, the heat exchanger 6220, the tank 6210, optionally the stripper reboiler 6215, a heat exchanger 6260, and the tank 6200, after which the acid gas exits the system 6000. Thus, upstream of the module 6100, the components of the flow path prepare the liquid absorbent for use in the module 6100, and, downstream of the module 6100, the components of this flow path recycle the amine for re-use with a byproduct being acid gas that exits the system 6100. In general, as known to those skilled in the art, the relative positions of certain components along the flow path of the liquid absorbent stream can be changed as appropriate, and/or certain components can be removed and/or replaced with similar components.

The sequence of the components along the flow path of the feed gas stream is a heat exchanger 6300, a flow meter 6310, a module 6320 with a temperature monitor and a pressure monitor, the port 6108, along the interiors of the membranes 6130, the port 6102, a module 6330 with a temperature monitor and a pressure monitor, a back pressure regulator 6340, and a tank 6350, after which the treated gas, such as relatively pure natural gas, exits the system 6100. In general, as known to those skilled in the art, the relative positions of certain components along the flow path of the feed stream can be changed as appropriate, and/or certain components can be removed and/or replaced with similar components.

The sequence of the components along the flow path of the compressed acid gas stream is a compressor (or blower) 6400 which takes a portion of the acid gas from tank 6200 and feeds it through a heat exchanger 6405 to the inlet 6112, and the interiors of the membranes 6120. Some of the acid gas flows from the interiors of the membranes 6120 to the port 6106, to a pressure monitor 6410, a back pressure regulator 6420, and a vent 6430, after which the acid gas leaves the system 6100. Some of the acid gas flows from the interiors of the membranes 6120, through the pores in the walls of the membranes 6120 to form acid gas bubbles along the exteriors of both the membranes 6120 and the membranes 6130, exiting the module 6100 through the port 6104.

Thus, the feed gas flows along the interiors of the membranes 6130 as the liquid absorbent flows in the opposite direction (counter-flows) along the exteriors of the membranes 6130 in the presence of the acid gas bubbles. The desired chemical reaction between the acid gas and the amine occurs due to the pores in the membranes 6130, which allow for direct contact of the acid gas and amine. The acid gas bubbles are believed to reduce the concentration polarization and the temperature polarization of the liquid absorbent stream, to enhance diffusion of reaction product(s) to the bulk phase of the liquid absorbent stream, and/or to reduce fouling of the membranes 6130.

While FIG. 6 shows a particular configuration of a system that uses a hollow fiber membrane module in an acid gas removal process, the disclosure is not limited to such embodiments. As an example, the respective inlet and outlet ports for the liquid absorbent and feed gas streams can be switched, such that the liquid absorbent flows along the interiors of the membranes 6130 as the feed gas counter-flows along the exteriors of the membranes 6130 in the presence of the acid gas bubbles. As another example, the respective inlet and outlet ports of the streams can be modified so that the liquid absorbent and feed gas streams flow along the membrane in the same direction (rather than counter-flowing). Other arrangements are also possible.

Although reactions that use an amine as a basic reactant have been described, the disclosure is not limited in this sense. In general, any appropriate basic reactant can be used in addition to, or instead of, an amine.

Water Treatment

In various settings, it may be desirable to treat relatively impure water to provide relatively pure water. An example of relatively impure water is waste water, which can contain various contaminants, such as organic matter, microorganisms and inorganic compounds. Another example of relatively impure water is produced water, which is generally highly saline and may contain additional contaminants, such as hydrocarbons (e.g., oil), suspended solids, heavy metals (e.g., zinc, lead, manganese, iron, barium) and/or traces of naturally occurring radioactive material.

In some embodiments, relatively pure water can be transferred from a relatively impure water source to a relatively pure liquid stream using membrane distillation. For example, this can be done by flowing a relatively hot feed stream containing the relatively impure water along one side of a porous and hydrophobic membrane while counter-flowing a relatively cool permeate stream containing relatively pure water along the opposite side of the membrane. The temperature difference between the two streams results in a partial pressure difference across the membrane. The partial pressure difference and the porous nature of the membrane allow water vapor to pass across the membrane from the relatively hot feed stream to the relatively cool permeate stream, where the water condenses to form liquid water in the permeate stream. At the same time, the hydrophobic nature of the membrane generally stops liquid water from passing directly through the membrane. The net result is a transfer of water from the feed stream of relatively impure water to the permeate stream of relatively pure water.

Figure 7:
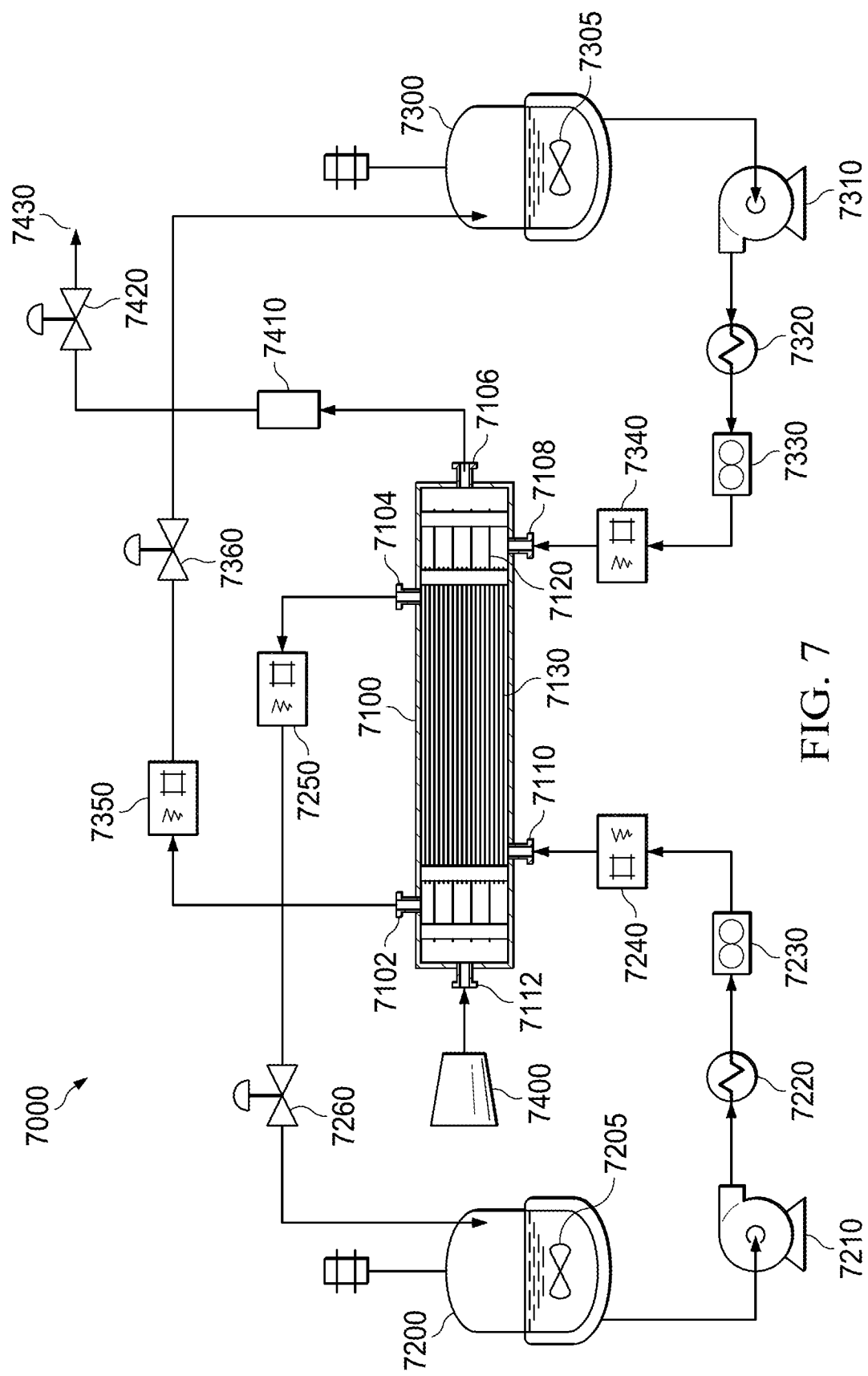
FIG. 7 is a schematic drawing of a system that uses a hollow fiber membrane module for water treatment via direct contact membrane distillation.

FIG. 7 is a schematic drawing of system 7000 configured to use a hollow fiber membrane module 7100 for water treatment via direct contact membrane distillation. The module 7100 includes six ports, 7102-7112, respectively, a plurality of longer hollow fiber membranes 7120 and a plurality of shorter hollow fiber membranes 7130. The system includes three fluid streams: 1) a relatively hot feed stream which is a stream of relatively impure water, such as a waste water stream or a produced water stream; 2) a relatively cool permeate stream which contains relatively pure water; and 3) a compressed gas (e.g., air) stream. Each stream enters the module 7100 through a respective port.

The sequence of the components along the flow path of the feed stream is a feed tank 7200 with a mixer 7205, a circulation pump 7210, a heat exchanger 7220, a flow meter 7230, a module 7240 for monitoring temperature and pressure, the port 7110, along the exteriors of both the membranes 7120 and the membranes 7130, the port 7104, a module 7250 with a temperature monitor and a pressure monitor, a back pressure regulator 7260, and the tank 7200. In general, as known to those skilled in the art, the relative positions of certain components along the feed stream flow path can be changed as appropriate, and/or certain components can be removed and/or replaced with similar components.

The sequence of the components along the flow path of the permeate stream is a permeate tank 7300 with a mixer 7305, a circulation pump 7310, a heat exchanger 7320, a flow meter 7330, a module 7340 with a temperature monitor and a pressure monitor, the port 7108, along the interiors of the membranes 7130, the port 7102, a module 7350 with a temperature monitor and a pressure monitor, a back pressure regulator 7360, and the tank 7300. In general, as known to those skilled in the art, the relative positions of certain components along the permeate stream flow path can be changed as appropriate, and/or certain components can be removed and/or replaced with similar components.

The sequence of the components along the flow path of the compressed gas (e.g., air) stream is a gas (e.g., air) compressor 7400, the port 7112, and the interiors of the membranes 7120. Some of the gas (e.g., air) flows from the interiors of the membranes 7120 to the port 7106, to a pressure monitor 7410, a back pressure regulator 7420 and a vent 7430. Some of the gas (e.g., air) flows from the interiors of the membranes 7120, through the pores in the walls of the membranes 7120 to form gas (e.g., air) bubbles in the relatively hot feed stream flowing along the exteriors of both the membranes 7120 and the membranes 7130, which exit the module 7100 through the port 7104.

Thus, the relatively cool permeate stream flows along the interiors of membranes 7130 while the gas (e.g., air) bubble-containing, relatively hot feed stream flows in the opposite direction (counter-flows) along the exteriors of the membranes 7130. As these streams counter-flow along the exteriors of the membranes 7130, water vapor is transferred from the feed stream to the permeate stream, after which the feed stream and the permeate stream continue along their respective flow paths downstream of the module 7100. The gas (e.g., air) bubbles are believed to reduce the concentration polarization and the temperature polarization of the feed stream. Alternatively or additionally, the gas (e.g., air) bubbles are believed to reduce contamination of the membranes 7130.

Although FIG. 7 shows a configuration of a system that uses a hollow fiber membrane module in a water treatment via direct contact membrane distillation, the disclosure is not limited to this configuration. As an example, the respective inlet and outlet ports for the feed and permeate streams can be switched, such that the relatively cool permeate stream contains bubbles as it flows along the exteriors of the membranes 7130, while the relatively hot feed stream does not contain bubbles as it counter-flows along the interiors of the membranes 7130. As another example, the respective inlet and outlet ports of the streams can be modified so that the relatively cool permeate and relatively hot feed streams flow along the membrane in the same direction (rather than counter-flowing).

Figure 8:
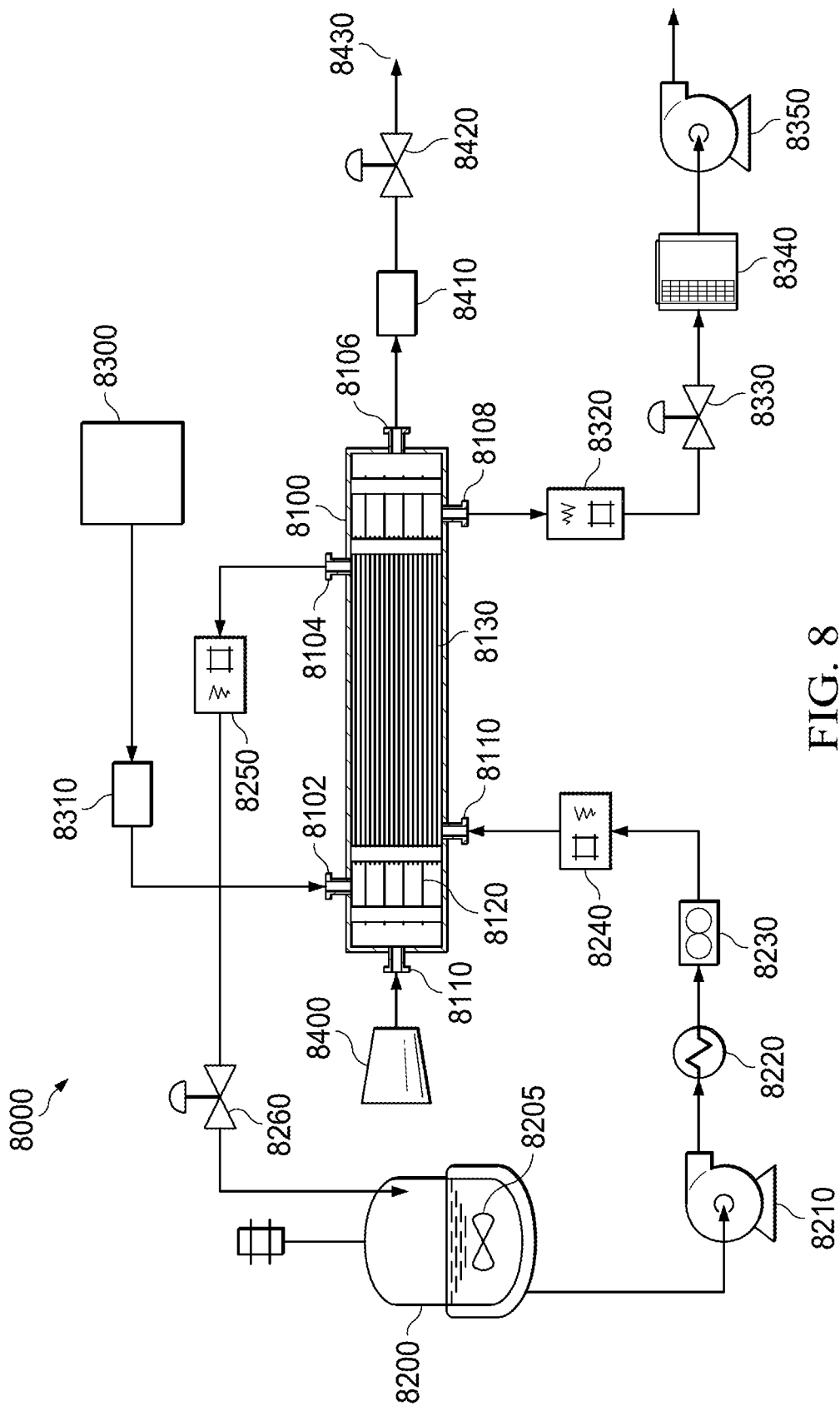
FIG. 8 is a schematic drawing of a system that uses a hollow fiber membrane module for water treatment via sweeping gas membrane distillation.

FIG. 8 is a schematic drawing of system 8000 configured to use a hollow fiber membrane module 8100 for water treatment via sweeping gas membrane distillation. In general, in sweeping gas membrane distillation, a cold dry gas flows along the permeate side of the membrane. The difference in temperature between the relatively hot feed stream and the relatively cool permeate (dry gas) stream results in the transfer of water vapor from the feed stream to the permeate stream. The permeate stream of dry gas carries the water vapor outside the module, where the water is condensed.

The module 8100 includes six ports, 8102-8112, respectively, a plurality of longer hollow fiber membranes 8120 and a plurality of shorter hollow fiber membranes 8130. The system includes three fluid streams: 1) a relatively hot feed stream containing relatively impure water, such as waste water stream or produced water stream; 2) a relatively cool permeate stream containing dry gas; and 3) a compressed gas (e.g., air) stream. Each stream is enters the module 8100 through a respective port.

The sequence of the components along the flow path of the feed stream is a feed tank 8200 with a mixer 8205, a circulation pump 8210, a heat exchanger 8220, a flow meter 8230, a module 8240 for monitoring temperature and pressure, the port 8110, along the exteriors of the relatively long hollow fiber membranes 8120 and the relatively short hollow fiber membranes 8130, the port 8104, a module 8250 with a temperature monitor and a pressure monitor, a back pressure regulator 8260, and the tank 8200. In general, as known to those skilled in the art, the relative positions of certain components along the feed stream flow path can be changed as appropriate, and/or certain components can be removed and/or replaced with similar components.

The sequence of the components along the flow path of the permeate stream is a dry gas source 8300, a flow controller 8310, the port 8102, the interiors of the membranes 8130, the port 8108, a module 8320 with a temperature monitor and a pressure monitor, a back pressure regulator 8330, a condenser 8340, and a vacuum pump 8350, after which the dry gas exits the system 8000. In general, as known to those skilled in the art, the relative positions of certain components along the permeate stream flow path can be changed as appropriate, and/or certain components can be removed and/or replaced with similar components.

The sequence of the components along the flow path of the compressed gas (e.g., air) stream is a gas (e.g., air) compressor 8400, the port 8112, and the interiors of the membranes 8120. Some of the gas (e.g., air) flows from the interiors of the relatively long hollow fiber membranes 8120 to the port 8106, to a pressure monitor 8410, a back pressure regulator 8420 and a vent 8430. Some of the gas (e.g., air) flows from the interiors of the membranes 8120, through the pores in the walls of the membranes 8120 to form gas (e.g., air) bubbles in the feed stream flowing along the exteriors of both the membranes 8120 and the membranes 8130, which exit the module 8100 through the port 8104.

Thus, the relatively cool permeate stream of dry gas flows along the interiors of membranes 8130 while the gas (e.g., air) bubble-containing, relatively hot feed stream counter-flows along the exteriors of the membranes 8130 in the opposite direction. As the cool permeate stream of dry gas and the gas-bubble containing feed stream counter-flow along the exteriors of the membranes 8130, water vapor is transferred from the relatively hot feed stream to the relatively cool feed stream, after which the feed stream and the permeate stream continue along their respective flow paths downstream of the module 8100. In the case of the permeate stream, the water vapor is condensed in the condenser 8340 to provide relatively pure water. The gas (e.g., air) bubbles are believed to reduce the concentration polarization and the temperature polarization of the feed stream. Alternatively or additionally, the gas (e.g., air) bubbles are believed to reduce contamination of the membranes 8130.

While FIG. 8 shows a system for using a hollow fiber membrane module in water treatment via sweeping gas membrane distillation, other embodiments are also encompassed by the disclosure. As an example, the respective inlet and outlet ports of the streams can be modified so that the permeate and feed streams flow along the membrane in the same direction (rather than counter-flowing).

Figure 9:
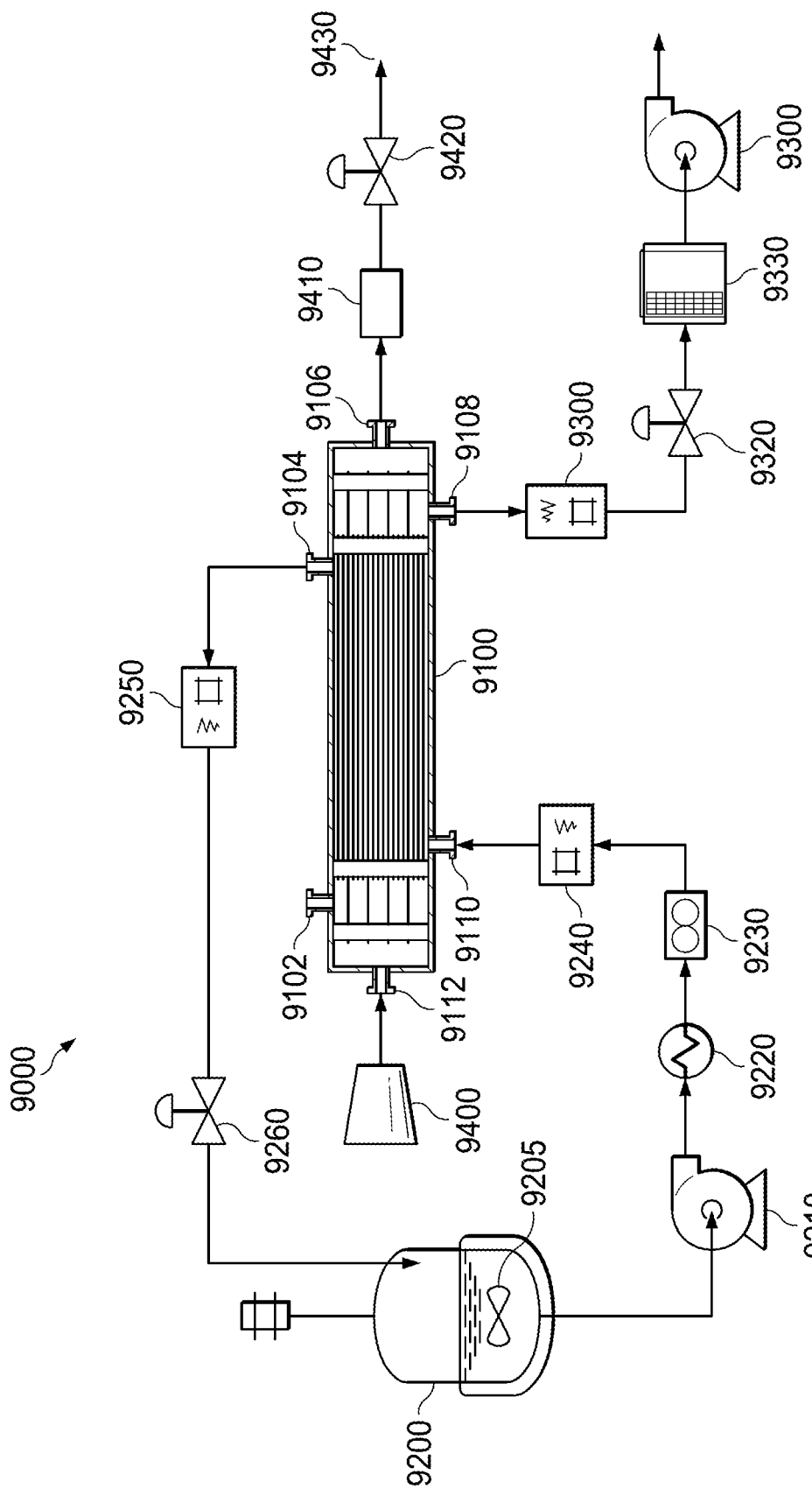
FIG. 9 is a schematic drawing of a system configured to use a hollow fiber membrane module for water treatment via vacuum membrane distillation.

FIG. 9 is a schematic drawing of system 9000 configured to use a hollow fiber membrane module 9100 for water treatment via vacuum membrane distillation. In general, in vacuum membrane distillation, a vacuum is applied on the permeate side of the membrane module, e.g., using a vacuum pump. Generally, the applied vacuum pressure is less than the saturation pressure of water vapor which results in the transfer of water vapor from the relatively hot feed stream to the permeate side of the membrane. The vacuum pressure carries the water vapor outside the module, where the water is condensed.

The module 9100 includes six ports, 9102-9112, respectively, a plurality of longer hollow fiber membranes 9120 and a plurality of shorter hollow fiber membranes 9130. The system includes three fluid streams: 1) a relatively hot feed stream which is a relatively impure stream, such as a waste water stream or a produced water stream; 2) a relatively cool permeate stream containing inert gas; and 3) a compressed gas (e.g., air) stream. Each stream is enters the module 9100 through a respective port.

The sequence of the components along the flow path of the feed stream is a feed tank 9200 with a mixer 9205, a circulation pump 9210, a heat exchanger 9220, a flow meter 9230, a module 9240 for monitoring temperature and pressure, the port 9110, along the exteriors of the relatively long hollow fiber membranes 9120 and the relatively short hollow fiber membranes 9130, the port 9104, a module 9250 with a temperature monitor and a pressure monitor, a back pressure regulator 9260, and the tank 9200. In general, as known to those skilled in the art, the relative positions of certain components along the feed stream flow path can be changed as appropriate, and/or certain components can be removed and/or replaced with similar components.

The permeate stream is formed by a vacuum pump 9300 that pulls a vacuum pressure on the port 9108. Between the port 9108 and the vacuum pump 9300, there are a module 9310 with a temperature monitor and a pressure monitor, a back pressure regulator 9320, and a condenser 9330. In general, as known to those skilled in the art, the relative positions of certain components along the permeate stream flow path can be changed as appropriate, and/or certain components can be removed and/or replaced with similar components.

The sequence of the components along the flow path of the compressed gas (e.g., air) stream is a gas (e.g., air) compressor 9400, the port 9112, and the interiors of the relatively long hollow fiber membranes 9120. Some of the gas (e.g., air) flows from the interiors of the relatively long hollow fiber membranes 9120 to the port 9106, to a pressure monitor 9410, a back pressure regulator 9420 and a vent 9430. Some of the gas (e.g., air) flows from the interiors of the membranes 9120, through the pores in the walls of the membranes 9120 to form gas (e.g., air) bubbles in the feed stream flowing along the exteriors of both the membranes 9120 and the membranes 9130, which exit the module 9100 through the port 9104.

Thus, the vacuum pressure is in the interiors of membranes 9130 while the gas (e.g., air) bubble-containing, relatively hot feed stream flows along the exteriors of the membranes 9130 in the opposite direction. As the gas (e.g., air) bubble-containing feed stream and the permeate stream counter-flow along the exteriors of the membranes 9230, water vapor is transferred from the relatively hot feed stream to the relatively cool feed stream, after which the feed stream and the permeate stream continue along their respective flow paths downstream of the module 9100. In the case of the permeate stream, the water vapor is condensed in the condenser 9330 to provide relatively pure water. The air bubbles are believed to reduce the concentration polarization and the temperature polarization of the feed stream. Alternatively or additionally, the gas (e.g., air) bubbles are believed to reduce contamination of the membranes 9130.

While FIG. 9 shows a system for using a hollow fiber membrane module in water treatment via vacuum membrane distillation, other embodiments are also encompassed by the disclosure. As an example, the respective inlet and outlet ports of the streams can be modified so that the permeate and feed streams flow along the membrane in the same direction (rather than counter-flowing).

Although not depicted in a figure, the disclosure encompasses a system configured to use a hollow fiber membrane module for water treatment via air gap membrane distillation. In such a system, a stagnant air gap is interposed between the surface of the hollow fiber membranes and the relatively cool permeate stream. Otherwise, the system is substantially similar to, for example, a system that uses a hollow fiber membrane for water treatment via direct contact membrane distillation, such as shown in FIG. 7.

Flue Gas Desulfurization

Figure 10:
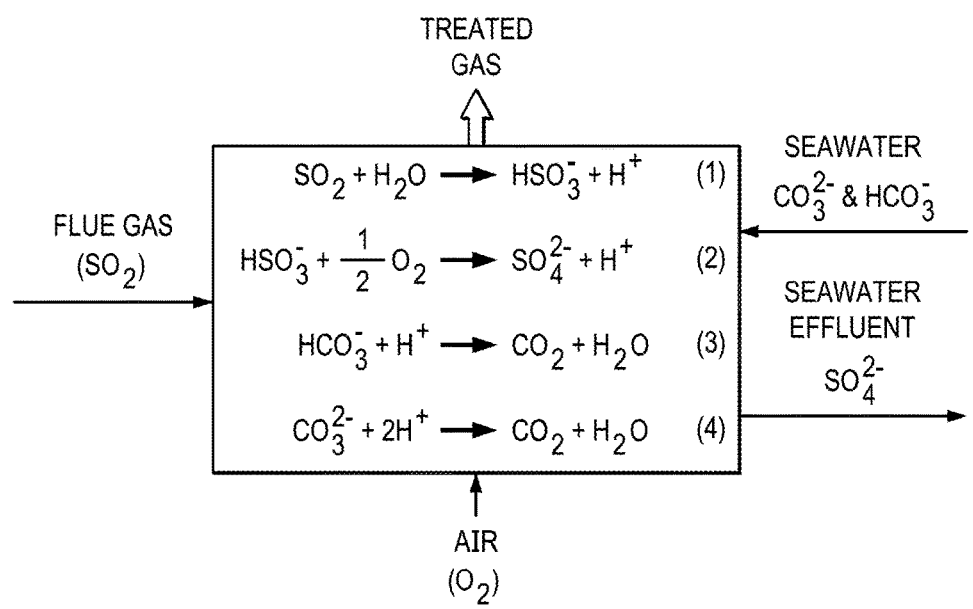
FIG. 10 schematically depicts a flue gas desulfurization system.

In general, flue gas is a gaseous byproduct of the combustion of a fuel, such as oil or natural gas. Often, flue gas contains sulfur dioxide. It is generally desirable to remove the sulfur dioxide ($SO_2$) from the flue gas, a process known as flue gas desulfurization. Flue gas desulfurization often involves reacting flue gas with sea water in the presence of a gas that contains oxygen ($O_2$), such as air, via a series of chemical reactions as shown in FIG. 10.

The reactions include the sulfur-related system (equations 1 and 2) and the carbonate-related system (equations 3 and 4). The $SO_2$ in flue gas is absorbed in water to form bisulfite ($HSO_3^-$), as described in equation 1. Bisulfite can also be converted to sulfite (SON which is known to be a source of chemical oxygen demand (COD) in the seawater effluent. Thus, in general, COD measurements in this case must be based on only $SO_3^{2-}$ ions. Due to the presence of oxygen gas ($O_2$) from the oxygen-containing gas (e.g., air), the $HSO_3^-$ (and $SO_3^{2-}$) is (are), in turn, oxidized to sulfate ($SO_4^{2-}$) as shown in equation 2.

According to equations 1 and 2, hydrogen ions ($H^+$) are produced and acidify the seawater effluent. It is generally desirable to neutralize the acidified seawater effluent so that it can be returned to the seawater body. This can be done using non-acidified seawater, which naturally contains $HCO_3^-$ and $CO_3^{2-}$. Equations 3 and 4 describe such a neutralization step which in known systems is commonly performed in a separate basin that contains a non-acidified seawater. As described below, the present disclosure provides a system in which such a basin can be avoided.

Figure 11:
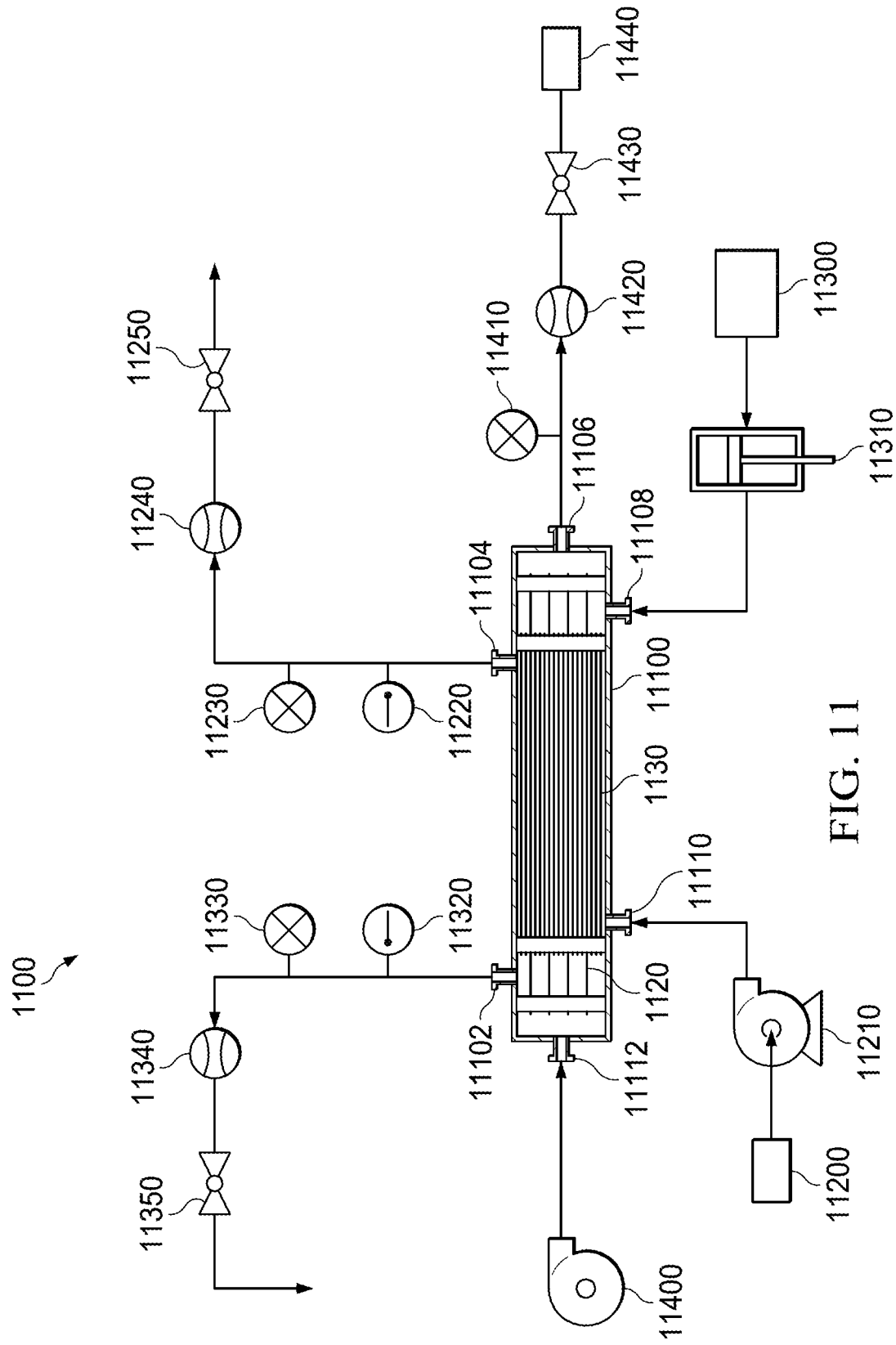
FIG. 11 is a schematic drawing of a system that uses a hollow fiber membrane module for flue gas desulfurization.

FIG. 11 shows a system 11000 that uses a hollow fiber membrane module 11100 in a gas desulfurization process. As described below, the module 11100 performs as a membrane contactor. The module 11100 includes six ports, 11102-11112, respectively, a plurality of longer hollow fiber membranes 11120 and a plurality of shorter hollow fiber membranes 11130. The system includes three fluid streams: 1) a seawater stream; 2) a flue gas stream; and 3) a compressed stream of the oxygen-containing gas (e.g., air). Each stream is enters the module 11100 through a respective port.

The sequence of the components along the flow path of the seawater stream is a seawater source 11200, a feed pump 11210, the port 11110, along the exteriors of both the membranes 11120 and the membranes 11130, the port 11104, a temperature monitor 11220, a pressure monitor 11230, a flow meter 11240, and a back pressure regulator 11250, after which the seawater effluent exits the system 11000. In general, as known to those skilled in the art, the relative positions of certain components along the seawater stream flow path can be changed as appropriate, and/or certain components can be removed and/or replaced with similar components.

The sequence of the components along the flow path of the flue gas stream is a flue gas source 11300, a compressor 11310, the port 11108, along the interiors of the relatively long hollow fiber membranes 11120, the port 11102, a temperature monitor 11320, a pressure monitor 11330, a flow meter 11340, and a back pressure regulator 11350, after which the treated flue gas exits the system 11000.

The sequence of the components along the flow path of the compressed stream of the oxygen-containing gas (e.g., air) is an oxygen-containing gas (e.g., air) compressor 11400, the port 11112, and the interiors of the membranes 11120. Some of the oxygen-containing gas (e.g., air) flows from the interiors of the membranes 11120 to the port 11106, to a pressure monitor 11410, a flow meter 11420, a back pressure regulator 11430 and a vent 11440. Some of the oxygen-containing gas (e.g., air) flows from the interiors of the membranes 11120, through the pores in the walls of the membranes 11120 to form oxygen-containing gas (e.g., air) bubbles in the seawater stream as it flows along the exteriors of both the membranes 11120 and the membranes 11130, which exit the module 11100 through the port 11104.

The pores in the relatively short hollow fiber membranes 11130 provide an interface for the seawater and the flue gas to react, allowing for absorption (equation 1). At the same time, the oxygen-containing gas (e.g., air) bubbles present in the seawater as it flows along the exteriors of both the membranes 11120 and the membranes 11130 allow for the oxidation reaction (equation 2) and the neutralization (equations 3 and 4) reactions to also take place within the module 11000. As a result, a separate basin that contains a non-acidified seawater or some other neutralizing agent/liquid need not be used.

As a result, the oxygen-containing gas (e.g., air) bubbles play a direct role in the chemical reaction. In addition, the oxygen-containing gas (e.g., air) bubbles are believed to reduce the concentration polarization and the temperature polarization of the feed stream, and/or to reduce contamination of the membranes 11130.

Without wishing to be bound by theory, it is believed that, in some embodiments, the residence time (or reaction time) of the absorption and oxidation and neutralization steps can be independently controlled by controlling (1) the flow rate of seawater, flue gas and compressed oxygen-containing gas (e.g., air), (2) number of membranes 11120 and 11130 in the module 11100, and (3) the length of the module 11100.

While FIG. 11 shows a system for using a hollow fiber membrane module in flue gas desulfurization, the disclosure is not limited to such a system. As an example, in some embodiments, the respective inlet and outlet ports of the streams can be modified so that the seawater and flue gas streams flow along the exteriors of the membranes 111130 in the same direction (rather than counter-flowing), and/or so that the seawater stream and the compressed oxygen-containing gas (e.g., air) that does not pass through the pores can flow through the system in the same direction (rather than counter-flowing). As another example, the respective inlet and outlet ports of the flue gas and the compressed oxygen-containing gas (e.g., air) can be modified so that the oxygen-containing gas (e.g., air) initially flows along the interior of the relatively short membranes 11130 rather than the interiors of the relatively long membranes 11120. For example, in some embodiments, the flue gas enters the module via the port 11106 and exits the module via the port 11112, and the seawater enters the module via the port 11110 and exits the module via the port 11104. In such embodiments, the compressed oxygen-containing gas (e.g., air) enters the module via the port 11108 and enters the interiors of the membranes 1130. The oxygen-containing gas (e.g., air) that passes through the pores in the membranes 11130 forms oxygen-containing gas (e.g., air) bubbles in the seawater flowing along the exteriors of the membranes 11120 and 11130 which exit the module via the port 11104, the oxygen-containing gas (e.g., air) that does not pass through the pores exiting the module via the port 11102. Other configurations are also possible.

Figure 12:
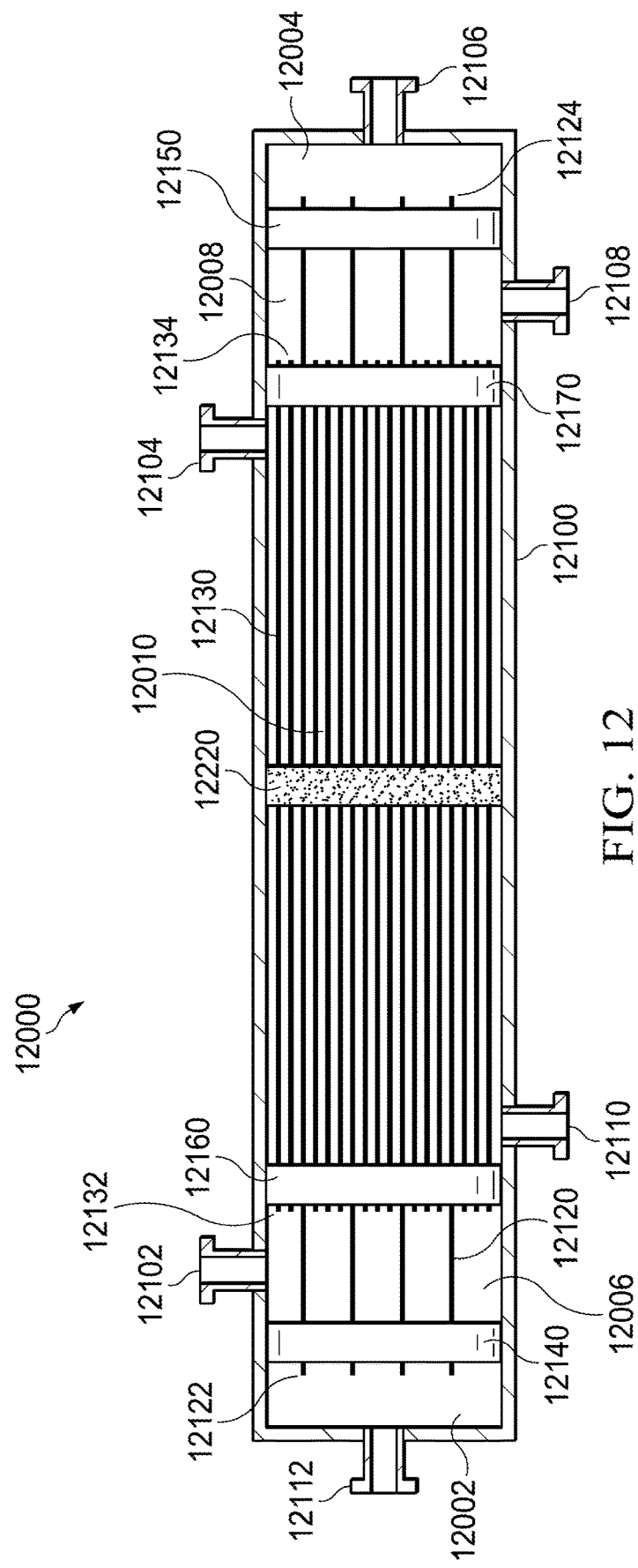
FIG. 12 is a schematic drawing of a hollow fiber membrane module with a baffle.

In some embodiments, it may be desirable to include one or more baffles in the module. For example, the baffle can enhance mixing of the flue gas, seawater and oxygen-containing gas (e.g., air) within the module. FIG. 12 shows a hollow fiber membrane module 12000 which includes a housing 12100 having six different ports 12102-12112, respectively. The module 12000 also includes longer hollow fiber membranes 12120 and shorter hollow fiber membranes 12130. The longer membranes 12120 are disposed in potting materials 12140 and 12150. One end 12122 of each longer membrane 12120 extends beyond the potting material 12140 and into a region 12002 of the module 12000, and the other end 12124 of each longer membrane 12120 extends beyond the potting material 12150 and into a region 12004 of the module 12000. The shorter membranes 12130 are disposed in potting materials 12160 and 12170. One end of each of the shorter membranes 12130 extends beyond the potting material 12160 and into a region 12006 and of the module 12000, and the other end of each of the shorter membranes 12130 extends beyond the potting material 12170 and into a region 12008 of the module 12000. The module 12000 also includes a region 12110 that contains both the membranes 12120 and the membranes 12130. The region 12010 also includes a baffle 12220.

While FIG. 12 shows a particular arrangement of a baffle within a hollow fiber membrane module, the disclosure is not limited in this sense. More generally, a hollow fiber membrane module can include one or more baffles positioned within the module as desired.

Although systems for flue gas desulfurization have been described in this section, such systems are not limited to use in flue gas desulfurization. In some embodiments, one or more of the systems can be used in a different process. For example, such a system can be used in any system (e.g., a scrubbing system) in which a chemical reaction with oxygen is implemented. An example of such a process is a wet limestone gypsum process in which a flue gas is desulfurized using a liquid containing limestone (calcium carbonate).

While the disclosure has provided certain embodiments, the disclosure is not limited to such embodiments.

As an example, while air has been disclosed as gas from which the bubbles can be formed, more generally any appropriate gas can be used. Examples of such gases include nitrogen gas ($N_2$), nitrogen enriched air, oxygen gas ($O_2$) enriched air, and noble gases (helium, neon, krypton, argon, xenon).

Other embodiments are covered by the claims.

What is claimed is:

1. A system, comprising:
    a first source configured to provide a first gas, the first gas comprising oxygen gas;
    a second source configured to provide a second gas, the second gas comprising sulfur dioxide;
    a third source configured to provide a liquid comprising water; and
    a membrane module, comprising:
        a housing, comprising:
            a plurality of porous hollow fiber membranes,
    wherein the system is configured so that, within the module, the sulfur dioxide reacts with the water to form products that undergo oxidation and neutralization to remove the sulfur dioxide from the second gas; and
    wherein the plurality of porous hollow fiber membranes comprises a first plurality of porous hollow fiber membranes and a second plurality of porous hollow fiber membranes different from the first plurality of porous hollow fiber membranes.

2. The system of claim 1, wherein the water comprises seawater.

3. The system of claim 1, wherein at least one of the following holds:
    the first plurality of porous hollow fiber membranes comprises a hydrophobic material, and the second plurality of porous hollow fiber membranes comprises a hydrophobic material;
    the first plurality of porous hollow fiber membranes comprises a hydrophobic material, and the second plurality of porous hollow fiber membranes comprises a hydrophobic coating supported by another material;
    the first plurality of porous hollow fiber membranes comprises a hydrophobic coating supported by another material, and the second plurality of porous hollow fiber membranes comprises a hydrophobic coating supported by another material; and
    at least one member selected from the group consisting of the first plurality of hollow fiber membranes and the second plurality of hollow fiber membranes comprises a hydrophobic material, and the hydrophobic material comprises at least one member selected from the group consisting of a polymeric material, a metallic material, a ceramic material, and a hybrid composite coated hydrophobic material.

4. The system of claim 1, wherein the second plurality of porous hollow fiber membranes is longer than the first plurality of porous hollow fiber membranes.

5. The system of claim 1, wherein the module further comprises:
    a first inlet port;
    a second inlet port different from the first inlet port;
    a third inlet port different from the first and second inlet ports,
    wherein:
        each of the first plurality of porous hollow fiber membranes comprises an interior and an exterior;
        each of the second plurality of porous hollow fiber membranes comprises an interior and an exterior; and
        the first source is configured to provide the first gas to the interiors of the second plurality of porous hollow fiber membranes; and
        pores in the second plurality of porous hollow fiber membranes are configured so that, during use of the system, some of the first gas within the interiors of the first plurality of porous hollow fiber membranes flows out of the second plurality of porous hollow fiber membranes via the pores in the second plurality of porous hollow fiber membranes.

6. The system of claim 5, wherein the system is configured so that, after flowing out of the second plurality of porous hollow fiber membranes via the pores in the second plurality of porous hollow fiber membranes, the first gas is between the exteriors of the first plurality of porous hollow fiber membranes and the exteriors of the second plurality of porous hollow fiber membranes.

7. The system of claim 6, wherein:
    the second source is configured to provide the second gas to the interiors of the first plurality of porous hollow fiber membranes via the second inlet; and
    the third source is configured to provide the liquid to the exteriors of the first plurality of porous hollow fiber membranes and to the exteriors of the second plurality of porous hollow fiber membranes via the second inlet.

8. The system of claim 7, wherein the system is configured so that, during use of the system, the sulfur dioxide reacts with water at pores in the first plurality of porous hollow fiber membranes.

9. The system of claim 8, wherein the system is configured so that, during use of the system, the products of the reaction of the sulfur dioxide and water undergo oxidation and neutralization between the exteriors of the first plurality of porous hollow fiber membranes and to the exteriors of the second plurality of porous hollow fiber membranes.

10. The system of claim 1, wherein the system is configured so that:
the first gas has a flow path through the module;
the second gas has a flow path through the module that is different from the flow path of the first gas through module; and
the liquid has a flow path through the module that is different from both the flow path of the first gas through module and the flow path of the second gas through the module.

11. A system, comprising:
a first source configured to provide a first gas, the first gas comprising oxygen gas;
a second source configured to provide a second gas, the second gas comprising sulfur dioxide;
a third source configured to provide a liquid comprising water; and
a membrane module, comprising:
a housing, comprising:
a plurality of porous hollow fiber membranes,
wherein the system is configured so that:
the first gas has a flow path through the module;
the second gas has a flow path through the module that is different from the flow path of the first gas through module;
the liquid has a flow path through the module that is different from both the flow path of the first gas through module and the flow path of the second gas through the module; and
the plurality of porous hollow fiber membranes comprises a first plurality of porous hollow fiber membranes and a second plurality of porous hollow fiber membranes different from the first plurality of porous hollow fiber membranes.

12. The system of claim 11, wherein the second plurality of porous hollow fiber membranes is longer than the first plurality of porous hollow fiber membranes.

13. The system of claim 11, wherein the module further comprises:
a first inlet port;
a second inlet port different from the first inlet port;
a third inlet port different from the first and second inlet ports,
wherein:
each of the first plurality of porous hollow fiber membranes comprises an interior and an exterior;
each of the second plurality of porous hollow fiber membranes comprises an interior and an exterior; and
the first source is configured to provide the first gas to the interiors of the second plurality of porous hollow fiber membranes; and
pores in the second plurality of porous hollow fiber membranes are configured so that, during use of the system, some of the first gas within the interiors of the first plurality of porous hollow fiber membranes flows out of the second plurality of porous hollow fiber membranes via the pores in the second plurality of porous hollow fiber membranes.

14. The system of claim 13, wherein the system is configured so that, after flowing out of the second plurality of porous hollow fiber membranes via the pores in the second plurality of porous hollow fiber membranes, the first gas is between the exteriors of the first plurality of porous hollow fiber membranes and the exteriors of the second plurality of porous hollow fiber membranes.

15. The system of claim 14, wherein:
the second source is configured to provide the second gas to the interiors of the first plurality of porous hollow fiber membranes via the second inlet; and
the third source is configured to provide the liquid to the exteriors of the first plurality of porous hollow fiber membranes and to the exteriors of the second plurality of porous hollow fiber membranes via the second inlet.

16. The system of claim 15, wherein the system is configured so that, during use of the system:
the sulfur dioxide reacts with water at pores in the first plurality of porous hollow fiber membranes; and
the products of the reaction of the sulfur dioxide and water undergo oxidation and neutralization between the exteriors of the first plurality of porous hollow fiber membranes and to the exteriors of the second plurality of porous hollow fiber membranes.

17. A method, comprising:
simultaneously introducing a first gas comprising sulfur dioxide into a first plurality of hollow fiber membranes of a membrane module, a second gas comprising oxygen gas into a second plurality of hollow fiber membranes of the membrane module, and water into an inner space of the membrane module so that, within module, sulfur dioxide is removed from the first gas, wherein:
each of the first gas, the second gas and the water has a different flow path within the membrane module; and
the first plurality of hollow fiber membranes is different from the second plurality of hollow fiber membranes.

18. The method of claim 17, further comprising, reacting the sulfur dioxide and water at pores of the hollow fiber membranes, thereby forming products.

19. The method of claim 18, further comprising oxidizing and neutralizing the products within the module.

20. The method of claim 17, wherein the first gas comprises flue gas.

* * * * *